US012221254B2

(12) United States Patent
Pinkstone

(10) Patent No.: US 12,221,254 B2
(45) **Date of Patent: *Feb. 11, 2025**

(54) PACKAGE FOR CONTAINERS

(71) Applicant: Graphic Packaging International, LLC, Atlanta, GA (US)

(72) Inventor: Felicia A. Pinkstone, Aston, PA (US)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,929

(22) Filed: Oct. 26, 2023

(65) Prior Publication Data

US 2024/0051706 A1 Feb. 15, 2024

Related U.S. Application Data

(62) Division of application No. 17/389,465, filed on Jul. 30, 2021, now Pat. No. 11,834,235.

(Continued)

(51) Int. Cl.

*B65D 5/50* (2006.01)
*B31B 50/26* (2017.01)

(Continued)

(52) U.S. Cl.

CPC ............ *B65D 5/5023* (2013.01); *B31B 50/26* (2017.08); *B65D 5/18* (2013.01); *B31B 2120/00* (2017.08)

(58) Field of Classification Search

CPC .......... B65D 5/5023; B65D 5/18; B65D 5/06; B65D 5/2038; B65D 5/2057; B65D 5/241;

(Continued)

(56) References Cited

U.S. PATENT DOCUMENTS 657,047 A 8/1900 Wagnitz
1,925,102 A 9/1933 Levkoff
(Continued)

FOREIGN PATENT DOCUMENTS

CN 304911927 11/2018
EP 0 639 504 2/1995
(Continued)

OTHER PUBLICATIONS

Sabra Guacamole on Facebook. Date posted: Mar. 17, 2022. Site visited: Dec. 6, 2022. Available online: https://www.facebook.com/Sabra/videos/542483033779199/(Year: 2022).

(Continued)

*Primary Examiner* — Christopher R Demeree
(74) *Attorney, Agent, or Firm* — Womble Bond Dickinson (US) LLP

(57) ABSTRACT

A construct for holding a plurality of containers. The construct can comprise a tray portion comprising at least a bottom panel and a side panel foldably connected to the bottom panel, a cover portion comprising at least a top panel, an open configuration for inserting or removing the plurality of containers from the construct, and a closed configuration for at least partially retaining the plurality of containers in the construct. The top panel can be opposite to the bottom panel and the cover portion can be spaced apart from the side panel when the construct is in the closed configuration. The tray portion can be for at least partially receiving at least a first container of the plurality of containers, and the construct can be for receiving a second container of the plurality of containers between the first container and the top panel when the construct is in the closed configuration.

13 Claims, 24 Drawing Sheets

Related U.S. Application Data

(60) Provisional application No. 63/165,849, filed on Mar. 25, 2021, provisional application No. 63/061,909, filed on Aug. 6, 2020, provisional application No. 63/059,341, filed on Jul. 31, 2020.

(51) Int. Cl.
*B65D 5/18* (2006.01)
*B31B 120/00* (2017.01)

(58) Field of Classification Search
CPC .. B65D 5/4204; B65D 5/5019; B65D 5/2021; B65D 5/6655; B65D 5/5011; B31B 50/26; B31B 2120/00; B65B 7/26
USPC .... 229/120.08, 103.2, 143, 148, 149, 162.1; 206/784, 485.1, 562; 493/162; 53/456
See application file for complete search history.

(56) References Cited

U.S. PATENT DOCUMENTS

D115,651 S 7/1939 Ford et al.
D120,673 S 5/1940 Jung
2,348,378 A 5/1944 Goodyear
2,586,301 A 2/1952 Castle
2,592,255 A 4/1952 Drees
2,794,585 A 6/1957 Wagner
2,939,622 A 6/1960 D'Ippolito
3,013,653 A 12/1961 Hedin
3,013,710 A 12/1961 Kronson et al.
3,014,578 A 12/1961 Tolaas
3,257,027 A 6/1966 Weiss
3,369,700 A 2/1968 Nelson
3,447,672 A 6/1969 Bailey et al.
3,456,844 A 7/1969 Planner
D216,843 S 3/1970 Lew
3,640,380 A 2/1972 Huffman
3,881,632 A 5/1975 Early et al.
D242,901 S 1/1977 Lohrbach
4,007,869 A 2/1977 Stolkin et al.
4,013,798 A * 3/1977 Goltsos .............. B65D 81/3453 426/118
D252,258 S 7/1979 Roccaforte
4,238,069 A 12/1980 Morris, Jr.
4,397,393 A 8/1983 Pergande et al.
4,413,769 A 11/1983 Michetti
4,511,042 A * 4/1985 Wischusen, III ...... B65D 5/064 229/122
4,530,459 A 7/1985 Maroszek
4,582,198 A 4/1986 Ditton
4,601,390 A 7/1986 Rosenthal et al.
D289,974 S 5/1987 Hamilton
4,671,453 A 6/1987 Cassidy
4,889,239 A 12/1989 Sandish
D319,388 S 8/1991 McIntosh, Jr. et al.
5,092,467 A * 3/1992 Elward ................ B65D 5/5011 206/485.1
D329,376 S 9/1992 Burd
5,299,734 A 4/1994 Lane
5,400,901 A 3/1995 Harrelson
5,501,335 A 3/1996 Harris
5,524,814 A 6/1996 Davis
5,540,333 A 7/1996 Gonzalez et al.
D372,386 S 8/1996 Kuchenbecker
D373,079 S 8/1996 Fahlen
5,551,556 A 9/1996 Sutherland
5,595,291 A 1/1997 Negelen
5,666,787 A 9/1997 Young et al.
D386,680 S 11/1997 Johnson
5,950,912 A 9/1999 Economopoulos
6,032,853 A 3/2000 Chevalier
D436,273 S 1/2001 Lange
D459,652 S 7/2002 Beutler
D460,355 S 7/2002 Lenz
D460,889 S 7/2002 Ong
6,439,452 B1 8/2002 Tsao
D467,798 S 12/2002 Cohon
6,530,516 B1 3/2003 Ritter
D491,061 S 6/2004 Bouroullec
D505,069 S 5/2005 Keberlein
D562,125 S 2/2008 Kienemund-Paroll
D568,733 S 5/2008 DuBois
7,476,830 B2 1/2009 Middleton et al.
7,568,594 B2 8/2009 Long
7,571,832 B2 8/2009 Mark
7,617,969 B2 11/2009 Oliveira
7,922,035 B2 4/2011 Long et al.
8,002,171 B2 8/2011 Ryan et al.
8,087,572 B2 1/2012 Kibbe
D664,429 S 7/2012 Arrigo
D665,271 S 8/2012 Halty
D671,832 S 12/2012 Rutherford
8,365,980 B2 2/2013 Wettlaufer et al.
D684,858 S 6/2013 Sill
8,534,538 B2 9/2013 Fitzwater
D693,242 S 11/2013 Birchmeier
8,584,884 B2 11/2013 Learn et al.
D695,104 S 12/2013 Sill
D700,840 S 3/2014 Vernon
D706,132 S 6/2014 Sill
8,740,054 B2 6/2014 Pinkstone
D727,732 S 4/2015 Petty
9,139,359 B1 9/2015 Simpson
9,156,579 B2 10/2015 Pinkstone
9,315,288 B2 4/2016 Pinkstone et al.
D755,624 S 5/2016 Ng
D777,027 S 1/2017 Baker et al.
D798,736 S 10/2017 Shoshan
D806,565 S 1/2018 Fath
9,868,563 B2 1/2018 Pinkstone
D859,169 S 9/2019 Lee
D869,289 S 12/2019 Sill
D889,956 S 7/2020 Uyeda
D900,638 S 11/2020 Wettlaufer
11,834,235 B2 12/2023 Pinkstone
2003/0102243 A1 6/2003 Sab
2003/0116581 A1 6/2003 Schmidt et al.
2003/0213705 A1 11/2003 Woog
2004/0124236 A1* 7/2004 Howard ............... B65D 5/5021 229/145
2006/0016863 A1 1/2006 Holt et al.
2006/0091190 A1 5/2006 Nikolai
2007/0051784 A1 3/2007 Money et al.
2010/0288824 A1 11/2010 Pinkstone et al.
2011/0180593 A1 7/2011 Wettlaufer et al.
2011/0248075 A1* 10/2011 House .................... B65D 5/029 229/5.5
2011/0253587 A1 10/2011 Pinkstone
2014/0353307 A1 12/2014 Pinkstone
2016/0052664 A1 2/2016 Ward, Jr.
2016/0096648 A1 4/2016 Pinkstone et al.
2020/0189822 A1* 6/2020 Smalley ................. B65D 71/42
2021/0061531 A1 3/2021 Pinkstone et al.
2021/0403199 A1* 12/2021 Weaver ................ B65D 5/5445
2022/0009685 A1 1/2022 Thompson
2022/0033134 A1 2/2022 Pinkstone

FOREIGN PATENT DOCUMENTS

EP 2 120 168 11/2009
GB 889 718 2/1962
GB 1 217 067 12/1970
KR 200452414 Y1 2/2011
KR 101102365 B1 1/2012
KR 20170127896 A 11/2017
SE 140 388 5/1953

OTHER PUBLICATIONS

Frego 4 Cup Glass Food Storage—Blue / EarthHero. Date first available: Apr. 20, 2020. Site visited: Dec. 6, 2022. Available online: https://earthhero.com/products/frego-4-cup-glass-foodtorage-blue (Year: 2020).

(56) References Cited

OTHER PUBLICATIONS

Sargento Balanced Breaks Cheese & Crackers. Date first available: Mar. 20, 2021. Site visited: Dec. 6, 2022. Available online: https://www.amazon.com/Sargento-Balanced-Crackers-Monterey-Original/dp/B08LRP4K4R/ref=cm_cr_arp_d_product_top?ie=UTF8 (Year: 2021).
Issue Notification for U.S. Appl. No. 17/389,465 dated Nov. 15, 2023.
Issue Fee Transmittal Form for U.S. Appl. No. 17/389,465 dated Oct. 26, 2023.
Notice of Allowance and Fee(s) Due for U.S. Appl. No. 17/389,465 dated Aug. 23, 2023.
Amendment B and Response to Final Office Action for U.S. Appl. No. 17/389,465 dated Aug. 15, 2023.
Office Action for U.S. Appl. No. 17/389,465 dated May 15, 2023.
Amendment A and Response to Office Action for U.S. Appl. No. 17/389,465 dated Jan. 27, 2023.
Office Action for U.S. Appl. No. 17/389,465 dated Oct. 28, 2022.
Response to Election of Species for U.S. Appl. No. 17/389,465 dated Jun. 29, 2022.
Office Action for U.S. Appl. No. 17/389,465 dated May 27, 2022.

* cited by examiner

PACKAGE FOR CONTAINERS

CROSS-REFERENCE TO RELATED APPLICATIONS

This application is a divisional of U.S. patent application Ser. No. 17/389,465, filed on Jul. 30, 2021, which claims the benefit of U.S. Provisional Patent Application No. 63/059,341 filed on Jul. 31, 2020, U.S. Provisional Patent Application No. 63/061,909 filed on Aug. 6, 2020, and U.S. Provisional Patent Application No. 63/165,849 filed on Mar. 25, 2021.

INCORPORATION BY REFERENCE

The disclosures of U.S. patent application Ser. No. 17/389,465, filed on Jul. 30, 2021, U.S. Provisional Patent Application No. 63/059,341, which was filed on Jul. 31, 2020, U.S. Provisional Patent Application No. 63/061,909, which was filed on Aug. 6, 2020, U.S. Provisional Patent Application No. 63/165,849, which was filed on Mar. 25, 2021, U.S. Design patent application Ser. No. 29/775,779, which was filed on Mar. 25, 2021, U.S. Design patent application Ser. No. 29/775,781, which was filed on Mar. 25, 2021, U.S. Design patent application Ser. No. 29/775,782, which was filed on Mar. 25, 2021, and U.S. Design patent application Ser. No. 29/775,783, which was filed on Mar. 25, 2021, are hereby incorporated by reference for all purposes as if presented herein in their entirety.

BACKGROUND OF THE DISCLOSURE

The present disclosure generally relates to constructs, wraps, cartons, and/or carriers for holding, displaying, dispensing, and/or transporting trays, tubs, containers, packets, pouches, bags, and/or other types of articles. More specifically, the present disclosure relates to wraps and other constructs that at least partially form compartments that hold one or more product holding containers.

SUMMARY OF THE DISCLOSURE

In general, one aspect of the disclosure is generally directed to a construct for holding a plurality of containers. The construct can comprise a tray portion comprising at least a bottom panel and a side panel foldably connected to the bottom panel, a cover portion comprising at least a top panel, an open configuration for inserting or removing the plurality of containers from the construct, and a closed configuration for at least partially retaining the plurality of containers in the construct. The top panel can be opposite to the bottom panel and the cover portion can be spaced apart from the side panel when the construct is in the closed configuration. The tray portion can be for at least partially receiving at least a first container of the plurality of containers, and the construct can be for receiving a second container of the plurality of containers between the first container and the top panel when the construct is in the closed configuration.

In another aspect, the disclosure is generally directed to a package comprising a construct comprising a tray portion and a cover portion. The tray portion can comprise at least a bottom panel and a side panel foldably connected to the bottom panel, and the cover portion can comprise at least a top panel. The package further can comprise a plurality of containers at least partially received in the construct. The construct can comprise an open configuration for inserting or removing the plurality of containers from the construct and a closed configuration at least partially retaining the plurality of containers in the construct. The top panel can be opposite to the bottom panel and the cover portion can be spaced apart from the side panel when the construct is in the closed configuration. The tray portion can at least partially receive at least a first container of the plurality of containers, and the construct can at least partially receive a second container of the plurality of containers between the first container and the top panel when the construct is in the closed configuration.

In another aspect, the disclosure is generally directed to a blank for forming a construct for holding a plurality of containers. The blank can comprise a first portion comprising at least a bottom panel and a side panel foldably connected to the bottom panel, the first portion being for at least partially forming a tray portion when the construct is formed from the blank. The blank also can comprise a second portion comprising at least a top panel, the second portion being for at least partially forming a cover portion when the construct is formed from the blank. The top panel can be for being positioned opposite to the bottom panel and the cover portion can be for being spaced apart from the side panel when the blank is formed into the construct in a closed configuration. The tray portion can be for at least partially receiving at least a first container of the plurality of containers when the construct is formed from the blank, and the construct formed from the blank can be for receiving a second container of the plurality of containers between the first container and the top panel when the blank is formed into the construct in the closed configuration.

In another aspect, the disclosure is generally directed to a method of forming a construct for holding a plurality of containers. The method can comprise obtaining a blank comprising a first portion comprising at least a bottom panel and a side panel foldably connected to the bottom panel and a second portion comprising at least a top panel. The method further can comprise forming a construct from the blank by folding the side panel relative to the bottom panel to at least partially form a tray portion of the construct and folding at least a portion of the second portion relative to the top panel to at least partially form a cover portion of the construct. The construct can comprise an open configuration for inserting or removing the plurality of containers from the construct and a closed configuration for at least partially retaining the plurality of containers in the construct. The top panel can be opposite to the bottom panel and the cover portion can be spaced apart from the side panel when the construct is in the closed configuration. The tray portion can be for at least partially receiving at least a first container of the plurality of containers, and the construct can be for receiving a second container of the plurality of containers between the first container and the top panel when the construct is in the closed configuration.

In another aspect, the disclosure is generally directed to a construct for holding a plurality of containers. The construct can comprise at least a bottom panel, a side panel foldably connected to the bottom panel, a top panel, and a top flap. A first container holder can be for at least partially retaining a first container of the plurality of containers, and at least the bottom panel and the side panel can cooperate to at least partially form the first container holder. A second container holder can be for at least partially retaining a second container of the plurality of containers, and at least the top panel and the top flap can cooperate to at least partially form the second container holder.

In another aspect, the disclosure is generally directed to a package that can comprise a construct comprising at least a bottom panel, a side panel foldably connected to the bottom panel, a top panel, and a top flap. At least the bottom panel and the side panel can cooperate to at least partially form a first container holder and at least the top panel and the top flap can cooperate to at least partially form a second container holder. The package further can comprise a plurality of containers comprising a first container at least partially retained in the first container holder and a second container at least partially retained in the second container holder.

In another aspect, the disclosure is generally directed to a construct for holding a plurality of containers. The construct can comprise a central panel at least partially defining a tray opening for at least partially receiving a first container of the plurality of containers, a tray front panel foldably connected to the central panel and extending downwardly from the central panel, a top panel at least partially defining a lid opening for at least partially receiving a second container of the plurality of containers, and a top front panel foldably connected to the top panel and extending downwardly from the top panel when the construct is in a closed configuration. The top front panel and the tray front panel can be in an at least partially overlapping relationship when the construct is in the closed configuration.

In another aspect, the disclosure is generally directed to a package that can comprise a plurality of containers comprising at least a first container and a second container. The package further can comprises a construct comprising a central panel at least partially defining a tray opening that at least partially receives the first container, a tray front panel foldably connected to the central panel and extending downwardly from the central panel, a top panel at least partially defining a lid opening that at least partially receives the second container, and a top front panel foldably connected to the top panel and extending downwardly from the top panel when the construct is in a closed configuration. The top front panel and the tray front panel can be in an at least partially overlapping relationship when the construct is in the closed configuration.

In another aspect, the disclosure is generally directed to a blank for forming a construct for holding a plurality of containers. The blank can comprise a central panel at least partially defining a tray opening for at least partially receiving a first container of the plurality of containers when the construct is formed from the blank and a tray front panel foldably connected to the central panel. The tray front panel can be for extending downwardly from the central panel when the construct is formed from the blank. The blank also can comprise a top panel at least partially defining a lid opening for at least partially receiving a second container of the plurality of containers when the construct is formed from the blank, and a top front panel foldably connected to the top panel. The top front panel can be for extending downwardly from the top panel when the construct formed from the blank is in a closed configuration. The top front panel and the tray front panel can be in an at least partially overlapping relationship when the construct formed from the blank is in the closed configuration.

Other aspects, features, and details of the present disclosure can be more completely understood by reference to the following detailed description, taken in conjunction with the drawings and from the appended claims.

BRIEF DESCRIPTION OF THE DRAWINGS

Those skilled in the art will appreciate the above stated advantages and other advantages and benefits of various additional embodiments reading the following detailed description of the embodiments with reference to the below-listed drawing figures. Further, the various features of the drawings discussed below are not necessarily drawn to scale. Dimensions of various features and elements in the drawings may be expanded ore reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to constructs, wraps, carriers, sleeves, cartons, or the like, and packages for holding and displaying articles such as containers, product holding containers, trays, tubs, packets, pouches, bags, boxes, etc. The articles can be used for packaging food and beverage products, personal care products, hardware, and/or stationery items for example. The articles can be made from materials suitable in composition for packaging the particular food or beverage item, and the materials include, but are not limited to, plastics such as PET, LDPE, LLDPE, HDPE, PP, PS, PVC, EVOH, and Nylon; paperboard and/or other paper products; glass and the like; aluminum and/or other metals; or any combination thereof.

Constructs according to the present disclosure can accommodate articles of numerous different shapes. For the purpose of illustration and not for the purpose of limiting the scope of the disclosure, the following detailed description describes tubs (e.g., plastic trays sealed with plastic films) and/or packets at least partially disposed within the carrier embodiments. In this specification, the terms "lower," "bottom," "upper," "top," "outer," and "inner" indicate orientations determined in relation to fully erected constructs or packages.

As described herein, constructs may be formed by multiple panels, end flaps, and/or other portions of blanks. Such panels, end flaps, and/or other portions of the blanks can be designated in relative terms to one another, e.g., "first", "second", "third", etc., in sequential or non-sequential reference, without departing from the disclosure.

Figure 1:
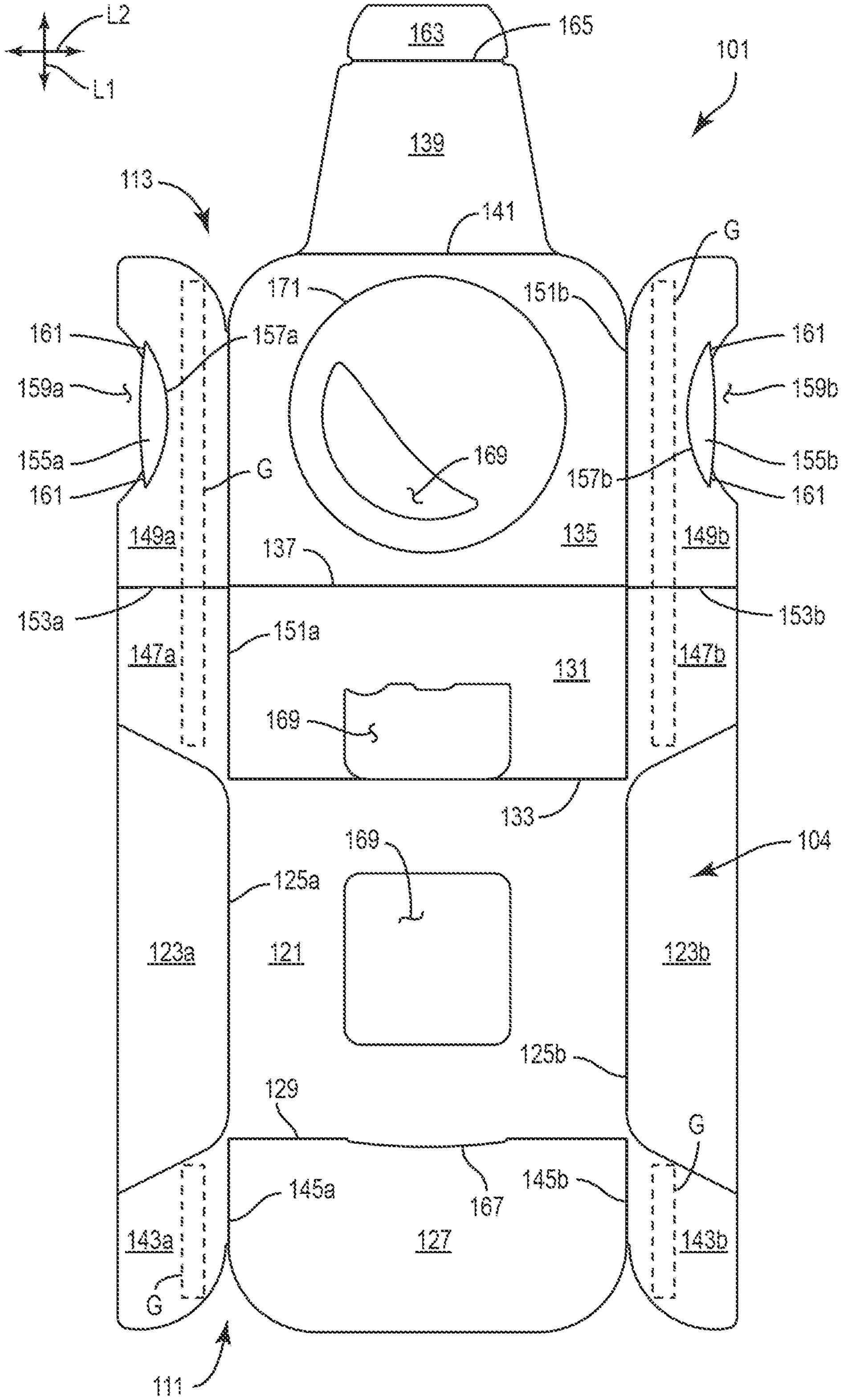
FIG. 1 is an exterior plan view of a blank used to form a construct (e.g., a carton, wrap, etc.) according to a first exemplary embodiment of the disclosure.

FIG. 1 is a plan view of a carton blank 101 used to form a construct or carton or wrap 103 (FIGS. 2-7) of a first exemplary embodiment of the disclosure. FIG. 1 shows an exterior or printed side 104 of the blank 101. As shown by way of example in FIGS. 3-7, the wrap 103 can be used to hold one or more containers C (e.g., a first container C1 and a second container C2) to form a package 105 that includes the wrap 103 and the containers C1, C2. For example, as shown in FIGS. 4-7, the wrap 103 can be configured to hold two containers C. Alternatively, the wrap 103 can be configured to receive or hold any suitable number of containers C. In one embodiment, the containers C can be sealed trays or tubs that hold respective food products, such as sauces, dips, spreads, toppings, etc. and/or chips, pretzels, etc., or any other food products or other products that are to be stored, shipped, displayed, sold, dispensed, etc., together. As shown in FIGS. 2-7, the wrap 103 can form at least a first or bottom portion 106 (e.g., a tray portion) with a first or bottom container holder 107 (e.g., a bottom compartment) and a second or top portion 108 (e.g., a cover portion) with a second or top container holder 109 (e.g., a top compartment) for at least partially retaining the respective containers C1, C2. In the illustrated embodiment, the features of the wrap 103 that form the bottom container holder 107 form a bottom compartment 107 for holding the first container C1 and the features that form the top container holder 109 can at least partially retain the second container C2 (e.g., against the top of the wrap 103).

As shown in FIG. 1, the carton blank 101 has a longitudinal axis L1 and a lateral axis L2. The blank 101 includes a first or lower portion 111 for forming the tray portion 106 and the bottom compartment 107 and a second or upper portion 113 for forming the cover portion 108 and the top container holder 109. As shown in FIG. 1, the blank 103 can include a central panel or bottom panel 121 foldably connected to a first side panel 123*a* along a fold line 125*a* and a second side panel 123*b* along a fold line 125*b*. A front panel 127 is foldably connected to the bottom panel 121 along a lateral fold line 129 and a back panel 131 is foldably connected to the bottom panel 121 along a lateral fold line 133. In the illustrated embodiment, the blank 101 further can include a top panel 135 foldably connected to the back panel 131 along a lateral fold line 137 and a closure panel 139 foldably connected to the top panel 135 along a lateral fold line 141. Any of the bottom panel 121, the side panels 123*a*, 123*b*, the front panel 127, the back panel 131, the top panel 135, and/or the closure panel 139 could be omitted or could be otherwise shaped, arranged, configured, and/or positioned without departing from the disclosure.

As shown in FIG. 1, the blank 101 further includes a plurality of glue panels including a first front glue panel 143*a* and a second front glue panel 143*b* foldably connected to opposite sides of the front panel 127 along respective longitudinal fold lines 145*a*, 145*b*. The plurality of glue panels further can include a first back glue panel 147*a* and a first top glue panel 149*a* foldably connected to the respective back panel 131 and top panel 135 along a longitudinal fold line 151*a* and a second back glue panel 147*b* and a second top glue panel 149*b* foldably connected to the respective back panel 131 and top panel 135 along a longitudinal fold line 151*b*. In the illustrated embodiment, the back glue panels 147*a*, 147*b* are foldably connected to the respective top glue panels 149*a*, 149*b* along respective lateral fold lines 153*a*, 153*b*. The first glue panels 143*a*, 147*a*, 149*a* and the first side panel 123*a* extend along a first marginal area of the blank 101 and the second glue panels 143*b*, 145*b*, 147*b* and the second side panel 123*b* extend along a second marginal area of the blank 101. The longitudinal fold lines 145*a*, 145*b*, 151*a*, 151*b* may be, for example, at least partially straight (e.g., substantially, generally, somewhat, and/or approximately straight) or offset at one or more locations to account for blank thickness or for other factors.

As shown in FIG. 1, the longitudinal fold lines 145*a*, 145*b* extend from respective ends of the lateral fold line 129 to an edge of the blank 103 and the longitudinal fold lines 151*a*, 151*b* extend from respective ends of the lateral fold line 133 to an opposing edge of the blank 103. In the illustrated embodiment, the fold lines 125*a*, 125*b* are at least partially U-shaped (e.g., somewhat, substantially, generally, approximately U-shaped) fold lines. Accordingly, in one embodiment, the first side panel 123*a* is foldably connected to the bottom panel 121 along a longitudinal segment of the U-shaped fold line 125*a* and to the first front glue panel 143*a* and the first back glue panel 147*a* along respective oblique segments of the U-shaped fold line 125*a*, and the second side panel 123*b* is foldably connected to the bottom panel 121 along a longitudinal segment of the U-shaped fold line 125*b* and to the second front glue panel 143*b* and the second back glue panel 147*b* along respective oblique segments of the U-shaped fold lines 125*b*. In one embodiment, the vertices formed at the intersections of the lateral fold line 129 and the longitudinal fold lines 145*a*, 145*b* and at the intersections of the lateral fold line 133 and the longitudinal fold lines 151*a*, 151*b* are spaced apart from the U-shaped fold lines 125*a*, 125*b*. Any of the fold lines, the glue panels, and/or the side panels could be omitted or could be otherwise shaped, arranged, configured, and/or positioned without departing from the disclosure. For example, one or more of the fold lines 129, 133, 145*a*, 145*b*, 151*a*, 151*b* could intersect with either or both of the U-shaped fold lines 123*a*, 123*b*.

In the illustrated embodiment, the blank 103 can include side or top flaps 155*a*, 155*b* foldably connected to the respective top glue panels 149*a*, 149*b* along respective curved fold lines 157*a*, 157*b*. As shown in FIG. 1, the top flaps 155*a*, 155*b* can extend adjacent to respective cutouts 159*a*, 159*b* in the respective top glue panels 149*a*, 149*b* and can be at least partially separable from the respective top glue panels 149*a*, 149*b* along respective cuts 161, which can extend from the respective ends of the curved fold lines 157*a*, 157*b* to the respective cutouts 159*a*, 159*b*. Any of the top flaps 155*a*, 155*b* and/or the cutouts 159*a*, 159*b* could be omitted or could be otherwise shaped, arranged, configured, and/or positioned without departing from the disclosure.

Figure 5:
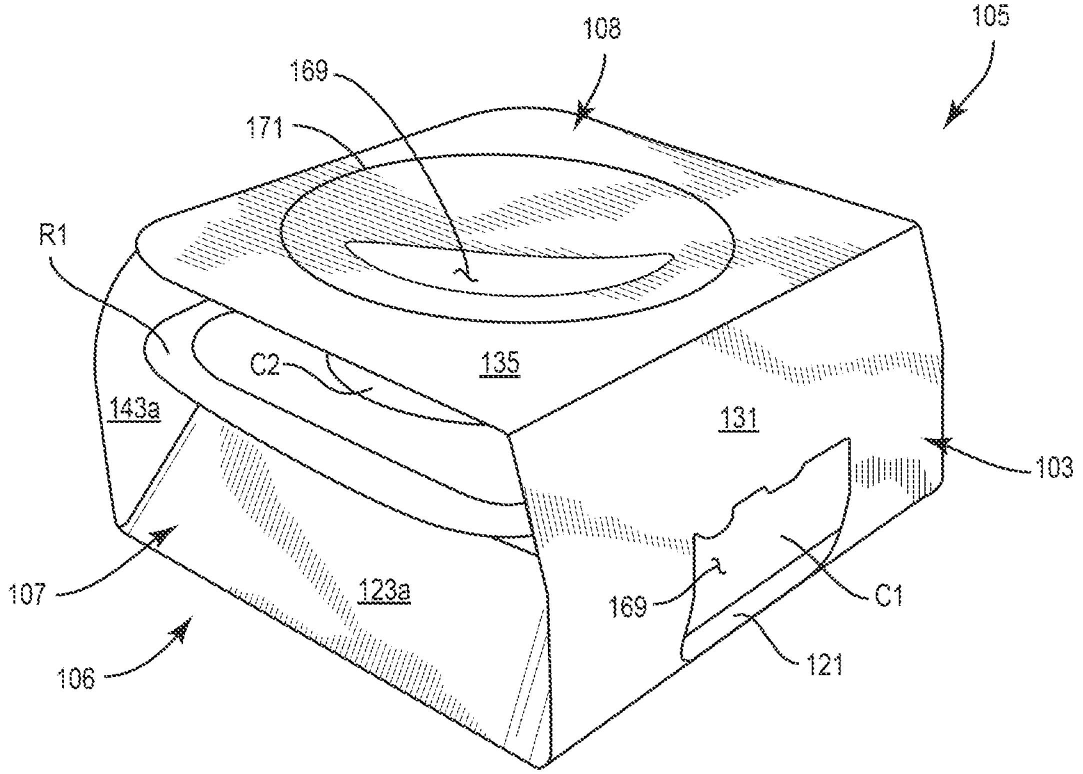
FIGS. 5 and 6 are perspective views of the package of FIG. 4 with the construct holding the articles/containers in a closed configuration according to the first exemplary embodiment of the disclosure.
Figure 6:
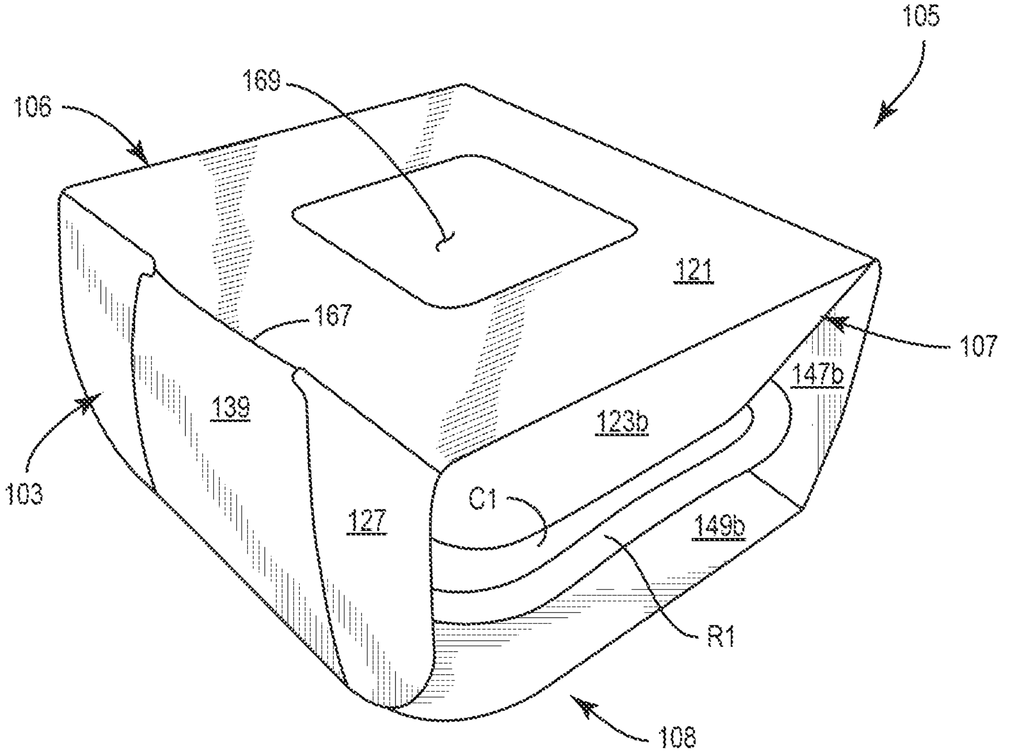
Figure 7:
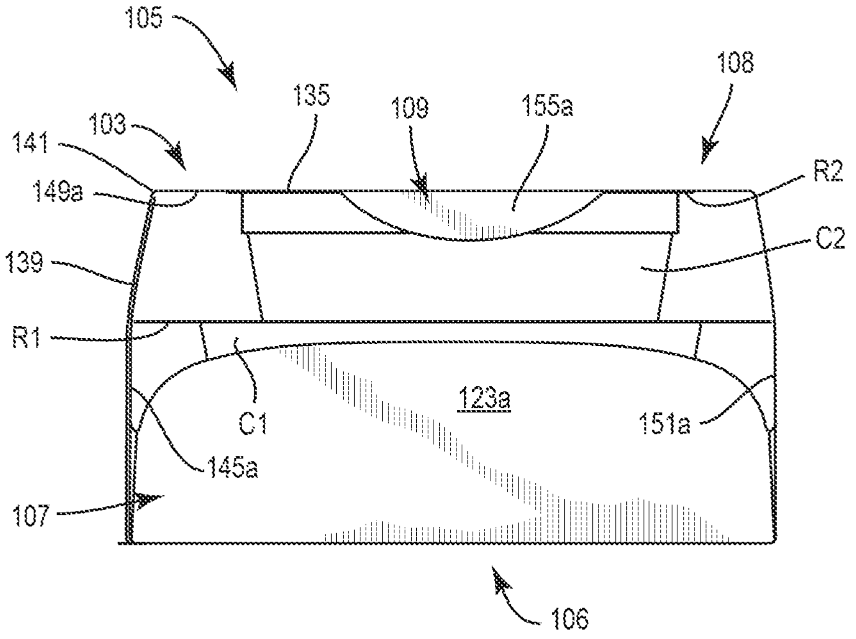
FIG. 7 is a side view of the package in the closed position of FIGS. 5 and 6 according to the first exemplary embodiment of the disclosure.

In the illustrated embodiment, the blank 103 can include closure features for helping to retain the wrap 103 in a closed position or configuration (FIGS. 5-7). As shown in FIG. 1, the closure features can include the closure panel 139, a closure tab 163 foldably connected to the closure panel 139 along a lateral fold line 165, and a slit 167 interrupting the lateral fold line 129, wherein the slit 167 can be at least partially defined between the front panel 127 and the bottom panel 121. In one embodiment, the front panel 127 can be at least partially separable from the bottom panel 121 along the slit 167 and at least a portion of the slit 167 can be offset from the fold line 129. In the illustrated embodiment, the slit 167 and the closure tab 163 can be sized so that the closure tab 163 can be inserted through the slit 167 when the wrap 103 is in a closed configuration. In one embodiment, edges of the closure tab 163 can engage the front panel 127 adjacent the slit 167 to help retain the wrap 103 in the closed configuration. Any of the closure features could be omitted or could be otherwise shaped, arranged, configured, and/or positioned without departing from the disclosure.

As shown in FIG. 1, the blank 103 can include openings 169 in the bottom panel 121, the back panel 131, and the top panel 135. In one embodiment, the openings 169 can form windows that allow the containers C1, C2 to be visible from the exterior of the wrap 103 (e.g., so that the containers, labels on the containers, and/or product in the containers are visible such as for inspection by a potential consumer). For example, one or both of the containers C1, C2 can be at least partially formed by transparent materials so that the contents of the containers are visible through the openings 169 and the transparent materials of the containers C1, C2. In addition, as shown in FIG. 1, the blank 101 can include surface features, such as an embossed feature 171 in the top panel 135. In one embodiment, the embossed feature 171, the openings 169, and/or other surface features can help distinguish the package 105 on a store shelf and/or can help accentuate text and/or graphics printed on the wrap 103, for example. The openings 169 and/or the surface features on the blank 101 could be omitted or could be otherwise shaped, arranged, configured, and/or positioned without departing from the disclosure. For example, in one alternative embodiment, the opening 169 in the back panel 131 is omitted.

In one embodiment, the lower portion 111 can include at least a portion of at least the bottom panel 121, the side panels 123*a*, 123*b*, the front panel 127, and the front glue panels 143*a*, 143*b* and the upper portion 113 can include at least a portion of at least the top panel 135, the top glue panels 149*a*, 149*b*, and the top flaps 155*a*, 155*b*. The blank 101 could be otherwise shaped, arranged, configured, and/or positioned without departing from the disclosure.

Referring additionally to FIGS. 2-7, formation of the wrap 103 from the blank 101 and the formation of the package 105 from the blank 101 and the wrap 103 and the containers C1, C2 according to one embodiment of the disclosure will be described. In the illustrated embodiment, the blank 101 can be oriented with the exterior surface 104 facing downwardly and glue can be applied to the glue panels 143*a*, 147*a*, 149*a*, 143*b*, 147*b*, 149*b* and/or to front panel 127, the back panel 131, and the top panel 135. In one exemplary embodiment, the glue can be applied to the interior surface of the glue panels 143*a*, 147*a*, 149*a*, 143*b*, 147*b*, 149*b* in the form of glue strips G (shown in dashed lines in FIG. 1 since the glue strips G are hidden in this view). Alternatively, the glue could be otherwise positioned on the blank or omitted without departing from the disclosure.

Figure 2:
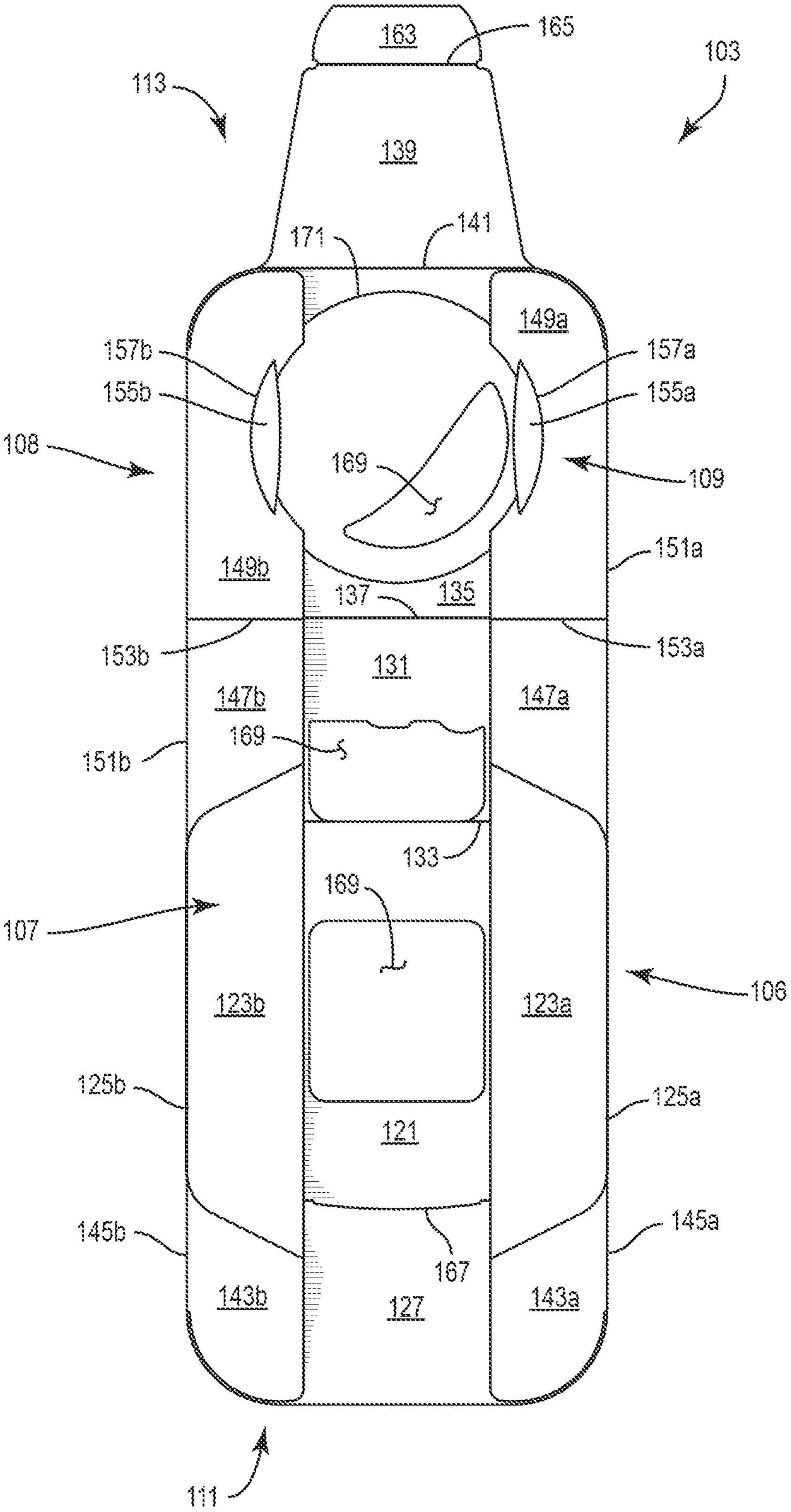
FIG. 2 is a plan view of the construct formed from the blank of FIG. 1 in a flat configuration according to the first exemplary embodiment of the disclosure.

As shown in FIG. 2, the wrap 103 can be formed from the blank 101 by folding the side panels 123*a*, 123*b* along the longitudinal portions of the respective fold lines 125*a*, 125*b* and folding the front glue panels 143*a*, 143*b*, 147*a*, 149*a*, 147*b*, 149*b* along the respective longitudinal fold lines 145*a*, 145*b*, 151*a*, 151*b* so that the side panels 123*a*, 123*b* and the glue panels 143*a*, 143*b*, 147*a*, 147*b*, 149*a*, 149*b* at least partially overlap the bottom panel 121, the front panel 127, the back panel 131, and the top panel 135. In the illustrated embodiment, the front glue panels 143*a*, 143*b* can be glued in face-to-face contact with the front panel 127, the back glue panels 147*a*, 147*b* are glued in face-to-face contact with the back panel 131, and the top glue panels 149*a*, 149*b* are glued in face-to-face contact with the top panel 135 with the glue strips G. In the illustrated embodiment at least a portion of each of the bottom panel 121, the side panels 123*a*, 123*b*, the front panel 127, and the back panel 131 can at least partially form the tray portion 106, and the top panel 135, the glue panels 149*a*, 149*b*, and the top panels 155*a*, 155*b* can at least partially form the cover portion 108. As shown in FIG. 2, the wrap 103 is in a flat configuration that can facilitate stacking the formed wrap 103 for efficient storage and/or shipping prior to loading the containers C1, C2 into the wrap 103.

Figure 3:
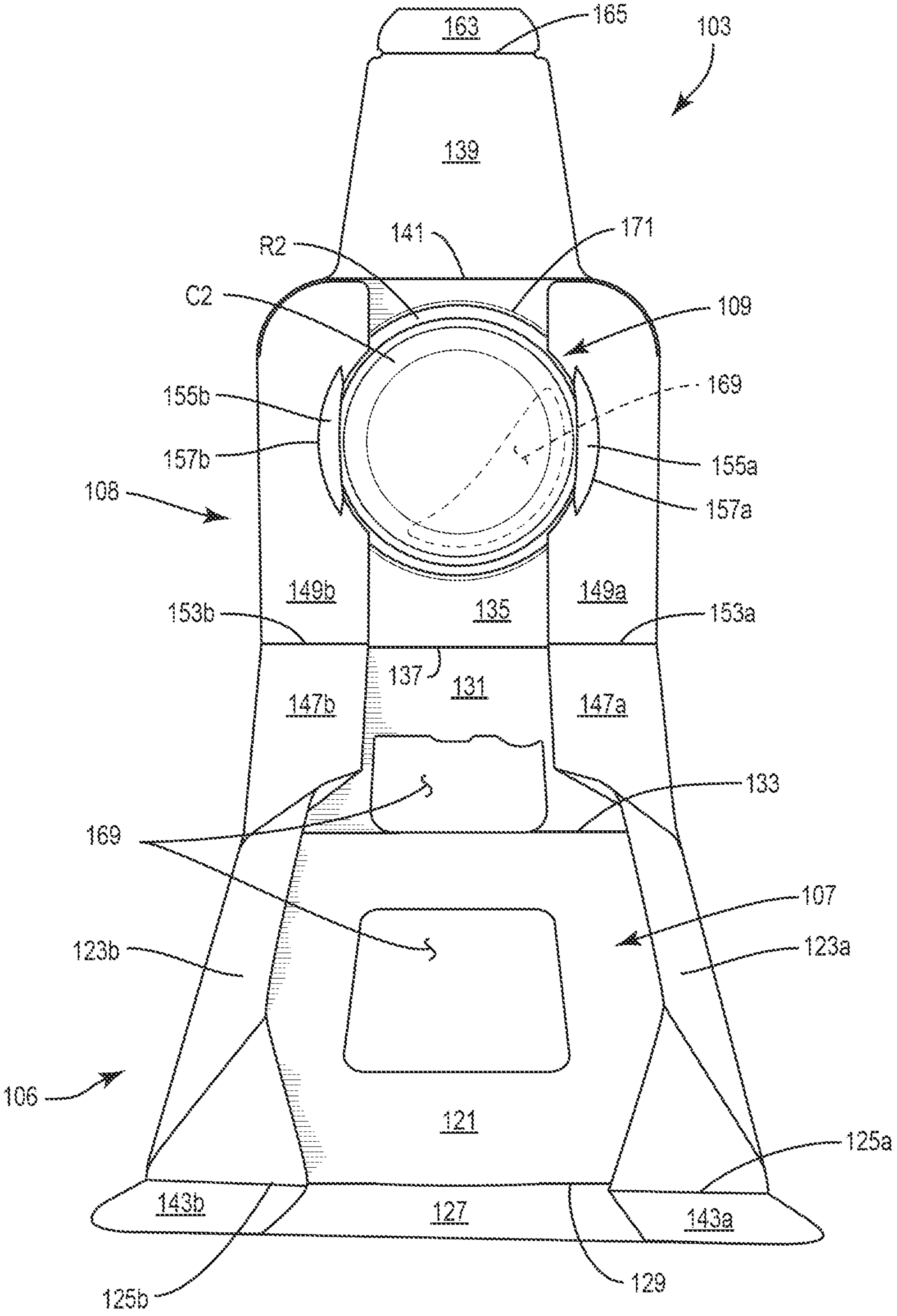
FIG. 3 is a perspective view of the construct formed from the blank of FIG. 1 in an open configuration according to the first exemplary embodiment of the disclosure.
Figure 4:
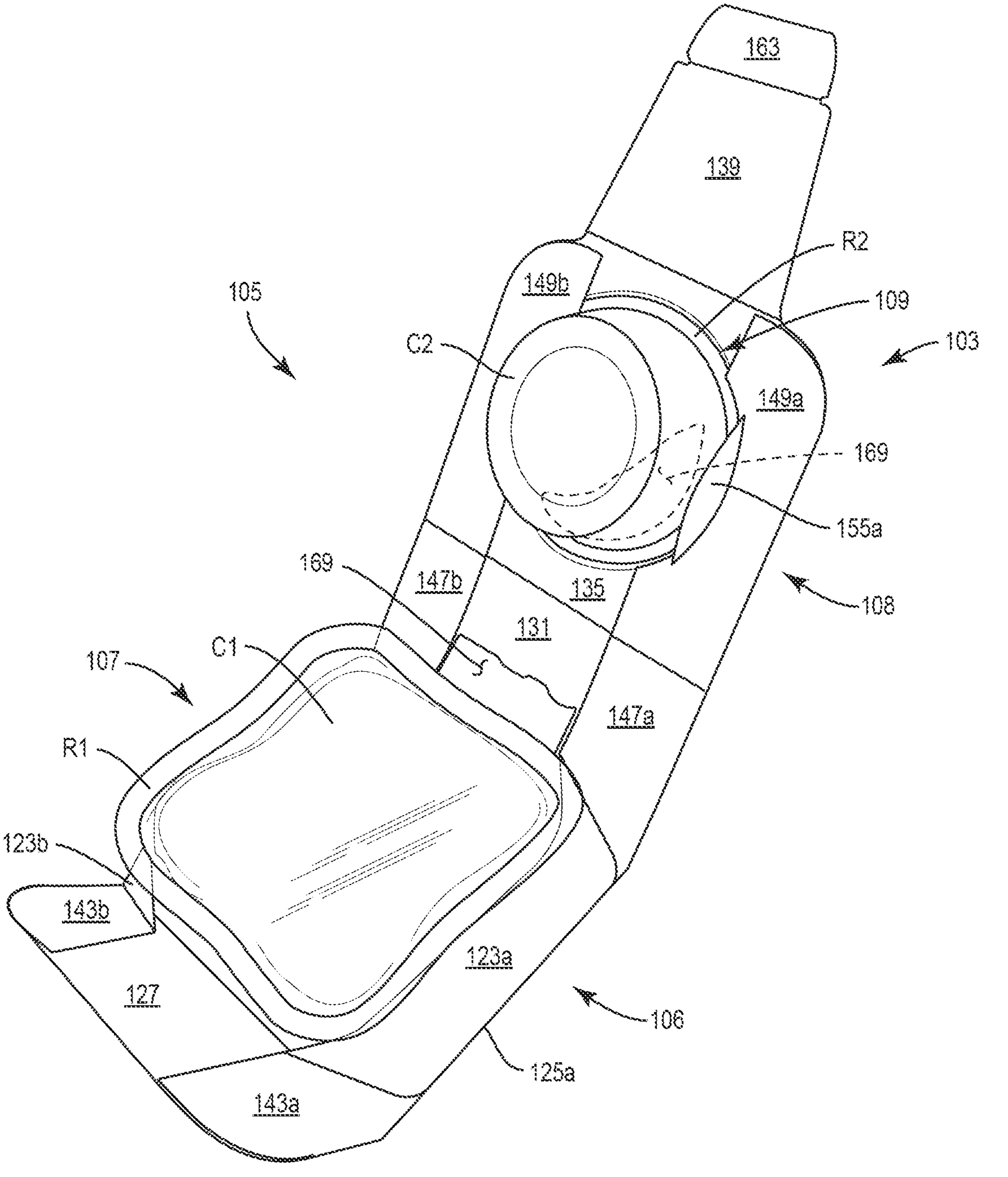
FIG. 4 is a perspective view of a package including the construct of FIGS. 2 and 3 in the open configuration of FIG. 3 holding a plurality of articles/containers according to the first exemplary embodiment of the disclosure.

In the illustrated embodiment, the wrap 103 can be moved from the flat configuration (FIG. 2) to an open configuration (FIGS. 3 and 4), wherein the side panels 123*a*, 123*b* can fold along the U-shaped fold lines 125*a*, 125*b* to pivot at least partially away from the bottom panel 121 and to at least partially form the bottom compartment 107 for receiving the container C1 in the wrap 103 as shown in FIG. 3. In one embodiment, the side panels 123*a*, 123*b* can bend and/or flex along at least a portion of their lengths as they are folded upwardly from the bottom panel 121 (e.g., FIGS. 3-7). As shown in FIG. 4, container C1 can be positioned on the bottom panel 121 between the side panels 123*a*, 123*b*, which can at least partially engage/contact the sides of the container C1 (e.g., extending under a rim R1 of the container C1) to help retain the container C1 in the bottom compartment 107. In one embodiment, folding the side panels 123*a*, 123*b* upwardly from the bottom panel 121 can cause the front panel 127 and the back panel 131 to at least partially fold upwardly with respect to the bottom panel 121. The front panel 127 and the back panel 131 further can help retain the container C1 in the bottom compartment 107 when the wrap 103 is in the open configuration and/or in a closed configuration (FIGS. 5-7). In one embodiment, the bottom panel 121, the side panels 123*a*, 123*b*, and at least portion of the front panel 127 and the back panel 131 can at least partially form the bottom compartment 107 in the tray portion 106.

As shown in FIGS. 3 and 4, a rim R2 of the container C2 can be inserted at least partially between the top glue panels 149*a*, 149*b* and the top panel 135 (e.g., between unglued portions of the top glue panels 149*a*, 149*b* and the top panel 135, outside the glue strips G). In one embodiment, the top flaps 155*a*, 155*b* can be folded along the curved fold lines 157*a*, 157*b* at least partially away from the top panel 135 and can engage the sides of the container C2 to help retain the container C2 in the top compartment 109. Accordingly, the top glue panels 149*a*, 149*b*, the top panel 135, and the top flaps 155*a*, 155*b* can at least partially form the top container holder 109 in the cover portion 108. In an exemplary embodiment, the containers C1, C2 can be inserted into the compartments after the glue panels 143*a*, 143*b*, 147*a*, 147*b*, 149*a*, 149*b* are glued to the panels 127, 131, 135 as described above or the containers C1, C2 can be aligned with the respective bottom panel 121 and top panel 135 before the glue panels are folded and glued to the front panel, the back panel, and the top panel and the compartments/container holders 107, 109 can be formed around portions of the respective containers C1, C2 as the glue panels and the side panels 123*a*, 123*b* are folded into position to form the wrap 103. The compartments/container holders 107, 109 could be otherwise formed and/or the containers C1, C2 could be otherwise loaded into the compartments/container holders 107, 109 without departing from the disclosure.

As shown in FIGS. 5-7, the wrap 103 can be moved to the closed configuration by folding along the lateral fold lines 129, 133, 137 153*a*, 153*b* and the oblique segments of the U-shaped fold lines 125*a*, 125*b* so that the front panel 127 and the back panel 131 extend at least partially upwardly from the bottom panel 121 and the top panel 135 extends opposite to the bottom panel 121. The top container holder 109 can be positioned above the bottom compartment 107 and the bottom of the container C2 can be positioned above the top of the container C1 (e.g., so that the container C1 at least partially supports the container C2). As shown in FIGS. 5-7, the container C1 can be at least partially received in and held by the bottom compartment 107 and the container C2 can be at least partially received by the wrap 103 between the container C1 and the top panel 135 and can be at least partially received in and held by the top container holder 109. In some embodiments, the front panel 127 and/or the back panel 131 can be at least partially angled with respect to vertical and/or at least partially curved between the bottom panel 121 and the top panel 135. As shown in FIG. 6, the closure panel 139 can be folded downwardly from the top panel 135 along the lateral fold line 141 so that the closure panel 139 at least partially overlaps the front panel 127. In the illustrated embodiment, the closure tab 163 can be folded along the lateral fold line 165 and inserted into the slit 167 as the closure panel 139 is folded against the front panel 127 (FIG. 6). Edges of the closure tab 163 adjacent to the lateral fold line 165 can engage the interior of the front panel 127 to help retain the wrap 103 in the closed configuration.

In the illustrated embodiment, the wrap 103 retaining the containers C1, C2 in the closed configuration in FIGS. 5-7 and/or in an open configuration in FIGS. 3 and 4 can form the package 105. In one embodiment, the open configuration can be for inserting the containers C1, C2 into the wrap 103 to form the package 105 and/or removing one or both of the containers C1, C2 from the package 105. As shown in FIGS. 5-7, the wrap 103 can retain the containers C1, C2 while providing visibility of the containers via the openings 169 and at partially open sides of the wrap 103 where the cover portion 108 (e.g., including at least the top panel 135, the top glue panels 149*a*, 149*b* and the top flaps 155*a*, 155*b*) is spaced apart from the side panels 123*a*, 123*b*. The wrap 103 and/or the package 105 could be otherwise formed without departing from the disclosure. For example, the containers C1, C2 could be loaded into (e.g., captured and secured in) the glued wrap 103 manually or by a machine.

In an exemplary embodiment, the package 105 can be opened (e.g., moved from the closed configuration of FIGS. 5-7 to the opened configuration (FIGS. 3 and 4) for removing the containers C1, C2 and/or for dispensing products from the containers C1, C2. For example, the closure tab 163 can be removed from the slit 167 and the wrap 103 can be folded along one or more of the lateral fold lines 133, 137, 153*a*, 153*b* to pivot the cover portion 108 (e.g., at least the top panel 135 and the top container holder 109) away from the tray portion 106 (e.g., at least the bottom panel 121, the side panels 123*a*, 123*b*, and the bottom compartment 107). In one embodiment, the product in the container C1 can be dispensed from the container C1 while the container is retained in the bottom compartment 107 and/or the container C1 can be removed from the bottom compartment 107 for dispensing product. The container C2 can be pulled out of the top compartment 109 (e.g., by removing the rim R2 from between the glue panels 149*a*, 149*b* and the top panel 135) and can be opened for dispensing product. The package 105 could be otherwise opened without departing from the disclosure. For example, one or more features of the wrap 103 could be cut or torn for allowing access to the containers C1, C2 and/or the product in the containers C1, C2. After the containers C1, C2 are removed from the wrap 103, the wrap 103 can be moved to the flat configuration of FIG. 2 in some embodiments.

Accordingly, the wrap 103 can hold the containers C1, C2 in the package 105 for display and sale of the items contained in the sealed trays (e.g., food items, personal care items, hardware, stationery items, etc.). In one embodiment, the wrap 103 can provide a simple, inexpensive, sustainable, one-piece construct to contain and protect individual products by trapping the products in the overlapping glue features. In an exemplary embodiment, the folded-over glue panels 143*a*, 147*a*, 149*a*, 143*b*, 147*b*, 149*b* can add strength to the wrap 103 to help protect the products (e.g., in the containers C1, C2) in addition to at least partially forming multiple trapping areas to secure different trayed products (e.g., for retail sale). In some embodiments, the blank 101 and the wrap 103 can comprise paperboard, which can be sustainable (e.g., made from renewable resources, recyclable, etc.) and can allow for high end graphic treatment, for example. In the illustrated embodiment, the openings 169 can form windows in the wrap 103 to allow for visibility of the products held by the wrap.

Figure 8:
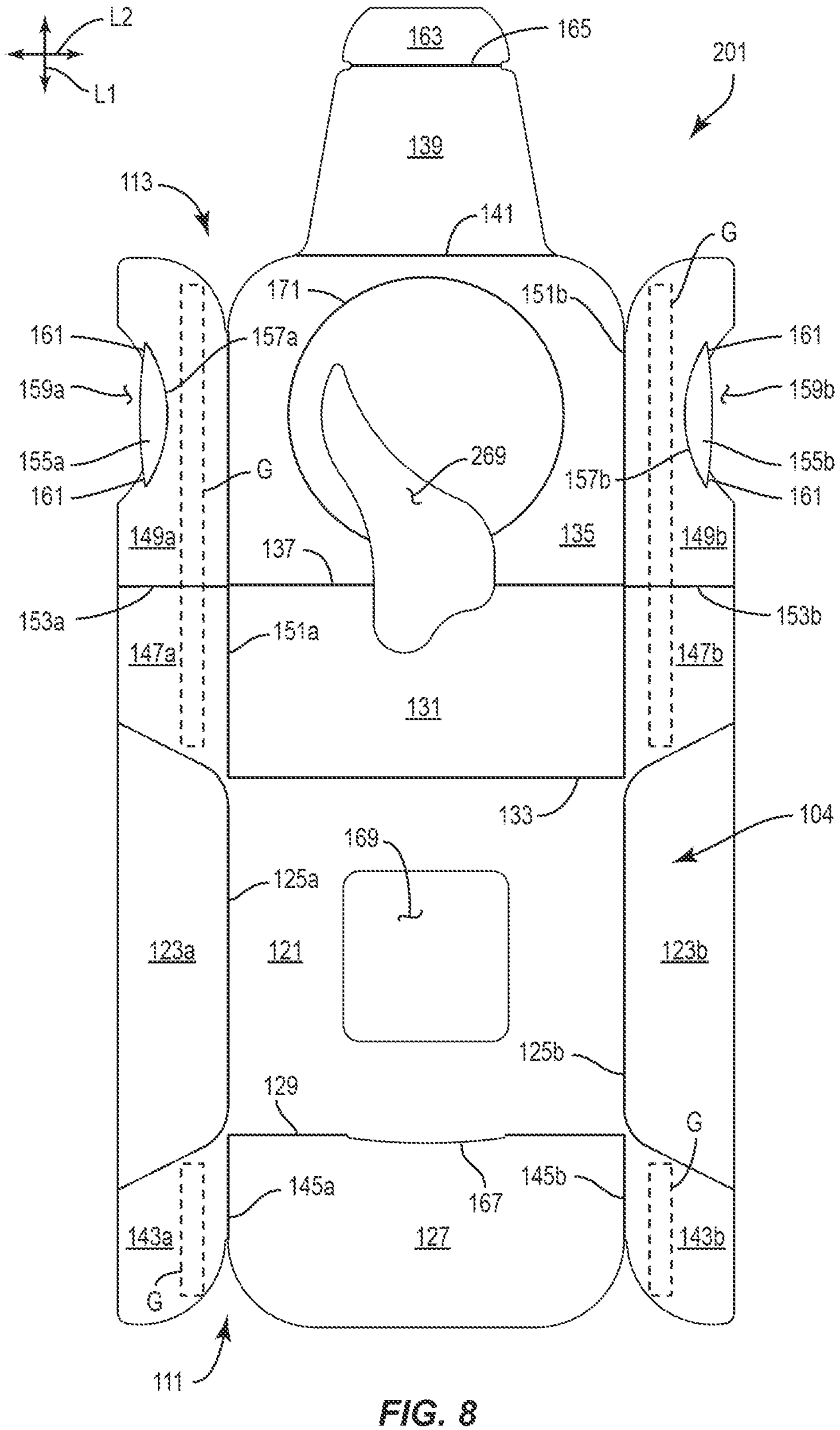
FIG. 8 is an exterior plan view of a blank used to form a construct according to a second exemplary embodiment of the disclosure.
Figure 9:
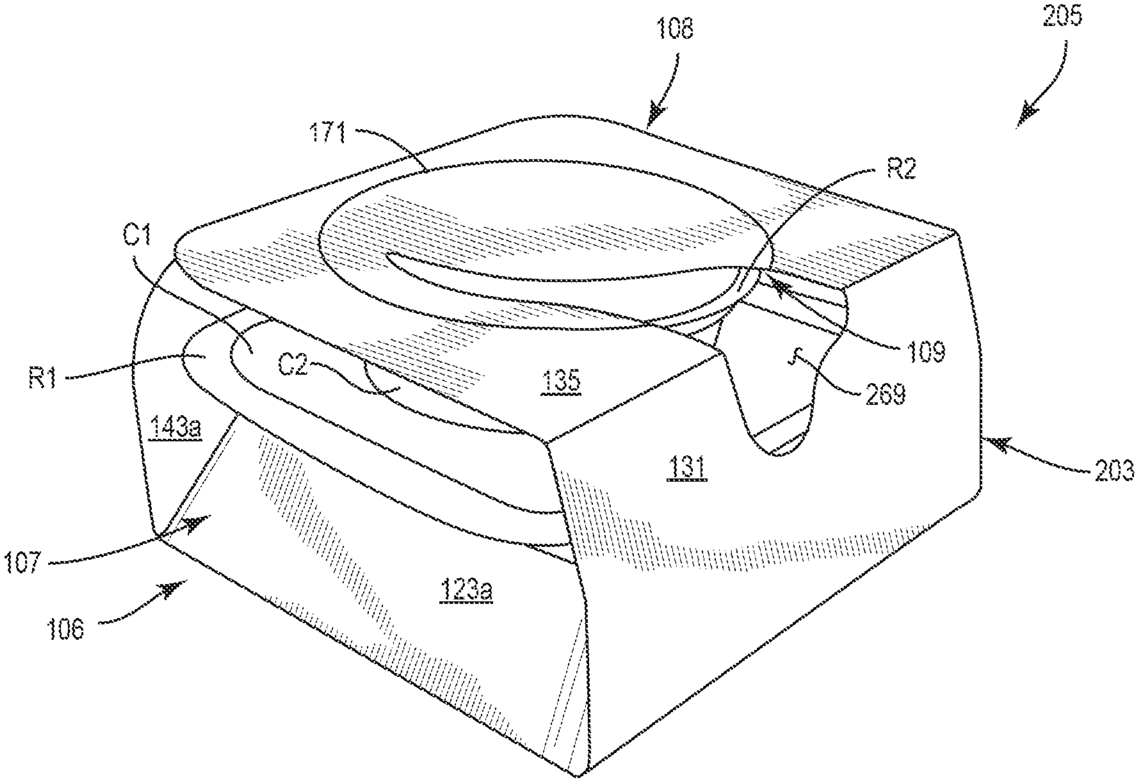
FIG. 9 is a perspective view of a package including a construct formed from the blank of FIG. 8 holding a plurality of articles/containers with the construct in a closed configuration according to the second exemplary embodiment of the disclosure.

FIG. 8 shows a blank 201 for forming a wrap 203 and package 205 (FIG. 9) according to a second embodiment of the disclosure. The second embodiment is generally similar to the first embodiment, except for variations noted and variations that will be apparent to one of ordinary skill in the art. Accordingly, similar or identical features of the embodiments have been given like or similar reference numbers. In the second embodiment, the blank 201 is similar to the blank 101 of FIG. 1 except that the opening 269 extending in the top panel 135 and the back panel 131 replaces the openings 169 in the top panel 135 and the back panel 131 of the first embodiment. The wrap 203 can be formed in the same manner or in a similar manner as the wrap 103 of the first embodiment, the containers C1, C2 can be loaded into the wrap 203 in the same manner or in a similar manner as the wrap 103 of the first embodiment, and the package 205 can be moved to the closed configuration in the same manner or in a similar manner as the wrap 103 of the first embodiment. In addition, the wrap 203 can be opened in the same manner or in a similar manner as the wrap 103 of the first embodiment.

Figure 10:
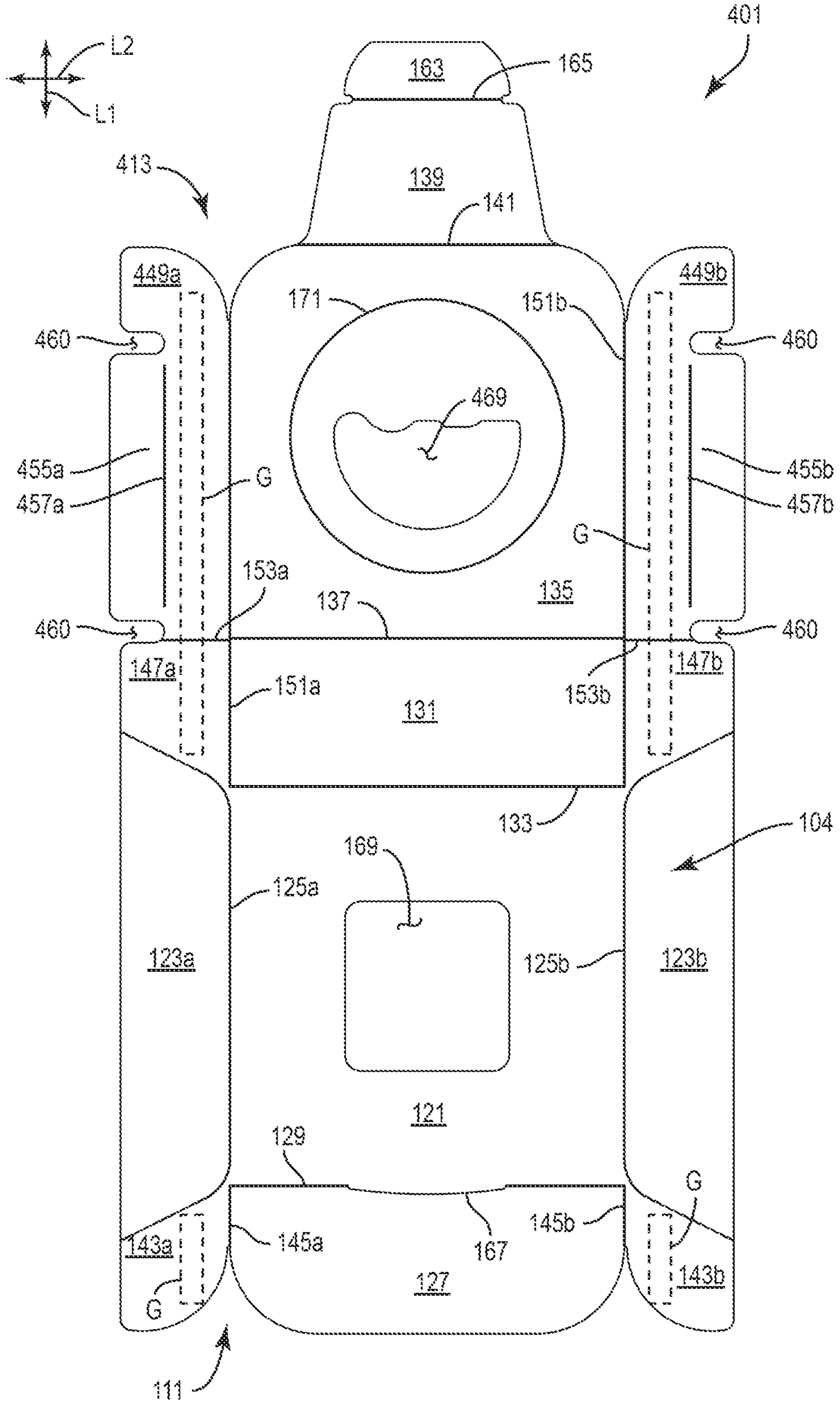
FIG. 10 is an exterior plan view of a blank used to form a construct according to a third exemplary embodiment of the disclosure.

FIG. 10 shows a blank 401 for forming a wrap 403 and package 405 (FIGS. 11-14) according to a third embodiment of the disclosure. The third embodiment is generally similar to the prior embodiments, except for variations noted and variations that will be apparent to one of ordinary skill in the art. Accordingly, similar or identical features of the embodiments have been given like or similar reference numbers. In the third embodiment, the wrap 403 formed from the blank 401 is configured for holding the container C1 (e.g., a sealed tray or tub) and a container C3 (e.g., a packet, pouch, bag, or other suitable container). In the illustrated embodiment, the relative proportions of different aspects of the blank 401 can be adjusted for holding the containers C1, C3 relative to the blanks of the prior embodiments configured for holding the containers C1, C2. As shown in FIG. 10, the second or upper portion 413 forms the cover portion 408 with the top container holder 409 (FIGS. 11-14), which can hold the packet C3. In the illustrated embodiment, the top glue panels 449*a*, 449*b* each can include two cutouts 460, and the side or top flaps 455*a*, 455*b* can be foldably connected to the top glue panels along respective longitudinal fold lines 457*a*, 457*b*. In one embodiment, the top flaps 455*a*, 455*b* can be rectangular (e.g., generally, substantially, approximately, somewhat rectangular) and can be partially defined by the cutouts 460 in the respective top glue panels 449*a*, 449*b*. As shown in FIG. 10, the top panel 135 can include an opening 469. The blank 401 could be otherwise shaped, arranged, configured, and/or positioned without departing from the disclosure. For example, the opening 469 could be replaced by any suitable opening (e.g., the openings of the other embodiments).

Figure 11:
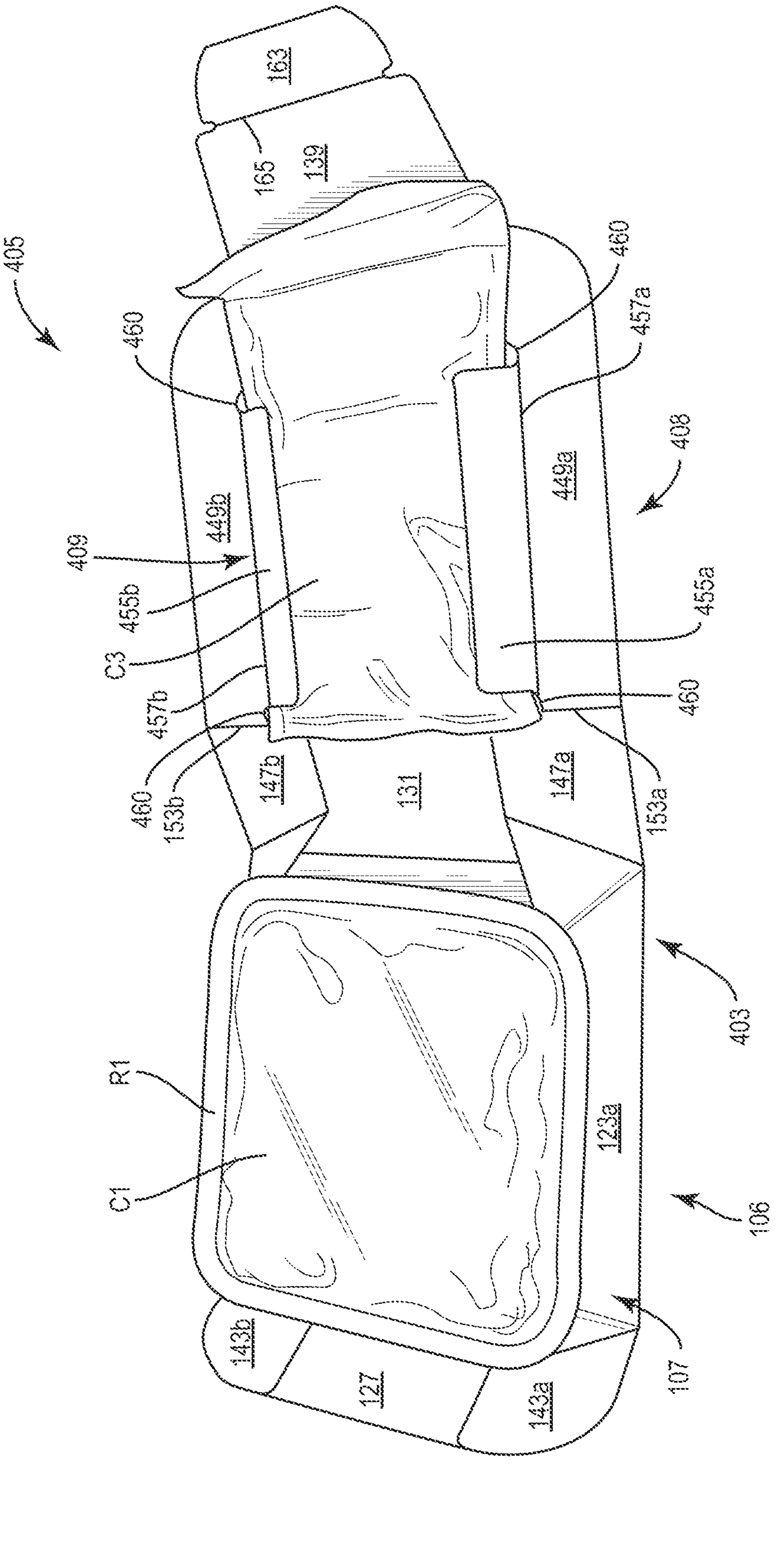
FIG. 11 is a perspective view of a package including a construct formed from the blank of FIG. 10 holding a plurality of articles/containers with the construct in an open configuration according to the third exemplary embodiment of the disclosure.
Figure 12:
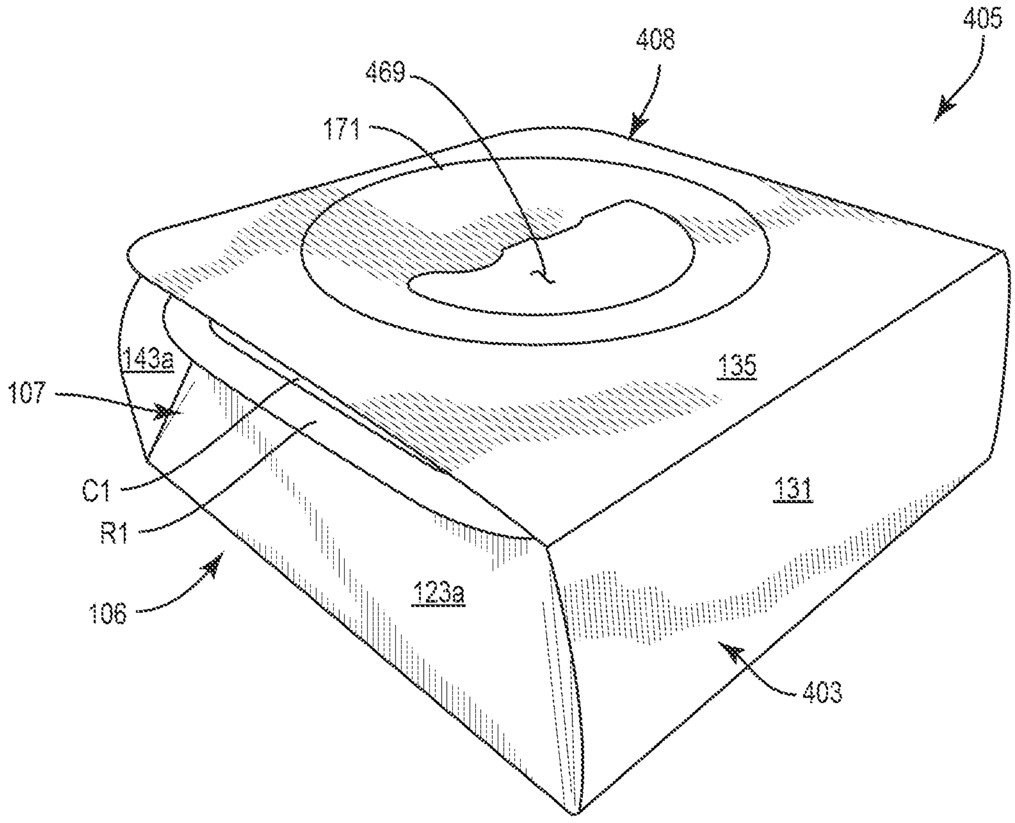
FIGS. 12 and 13 are perspective views of a package of FIG. 11 with the construct holding the articles/containers in a closed configuration according to the third exemplary embodiment of the disclosure.
Figure 13:
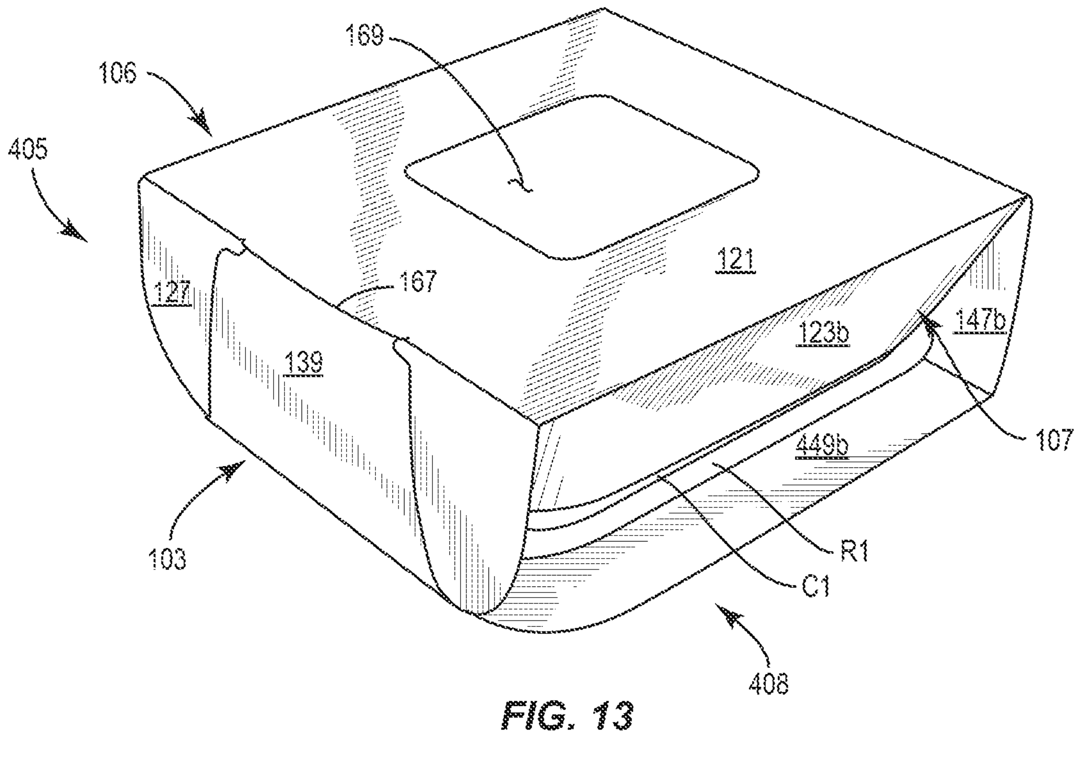
Figure 14:
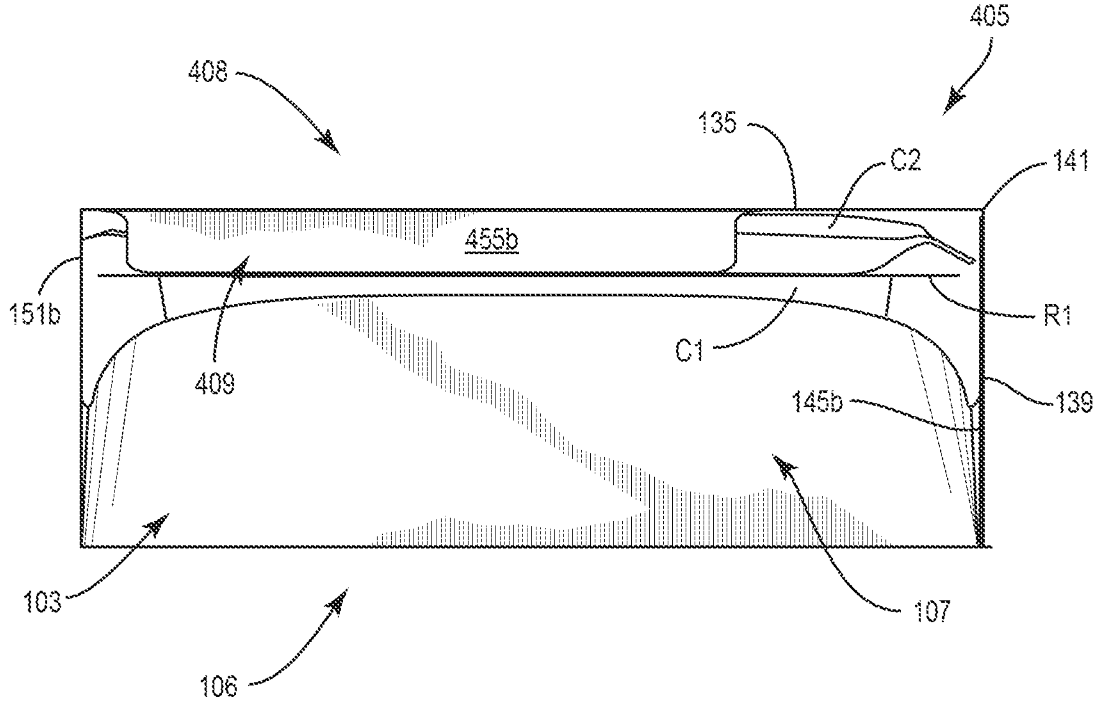
FIG. 14 is a side view of the package in the closed position of FIGS. 12 and 13 according to the third exemplary embodiment of the disclosure.

The wrap 403 (FIGS. 11-14) can be formed in the same manner or in a similar manner as the wraps 103, 203 of the prior embodiments, and the container C1 can be loaded into the wrap 403 (e.g., in the bottom compartment 107) in the same manner or in a similar manner as the wraps of the prior embodiments. The packet or container C3 can be loaded into the top container holder 409 by engaging the packet C3 between the top panel 135 and at least the top flaps 455*a*, 455*b* (FIGS. 11 and 14). Alternatively, the packet C3 can be engaged in the top container holder 409 by aligning the packet C3 with the top panel 135 on the blank 401 and engaging the packet C3 between the top panel 135 and at least the top flaps 455*a*, 455*b* when the top glue panels 449*a*, 449*b* are folded over and glued to the top panel 135 by the glue strips G. In one embodiment, the package 405 (FIGS. 11-14) and the wrap 403 with the containers C1, C3 can be moved into the closed configuration in the same manner or in a similar manner as the wraps of the prior embodiments. In addition, the wrap 403 can be opened in the same manner or in a similar manner as the wraps of the prior embodiments.

Figure 15:
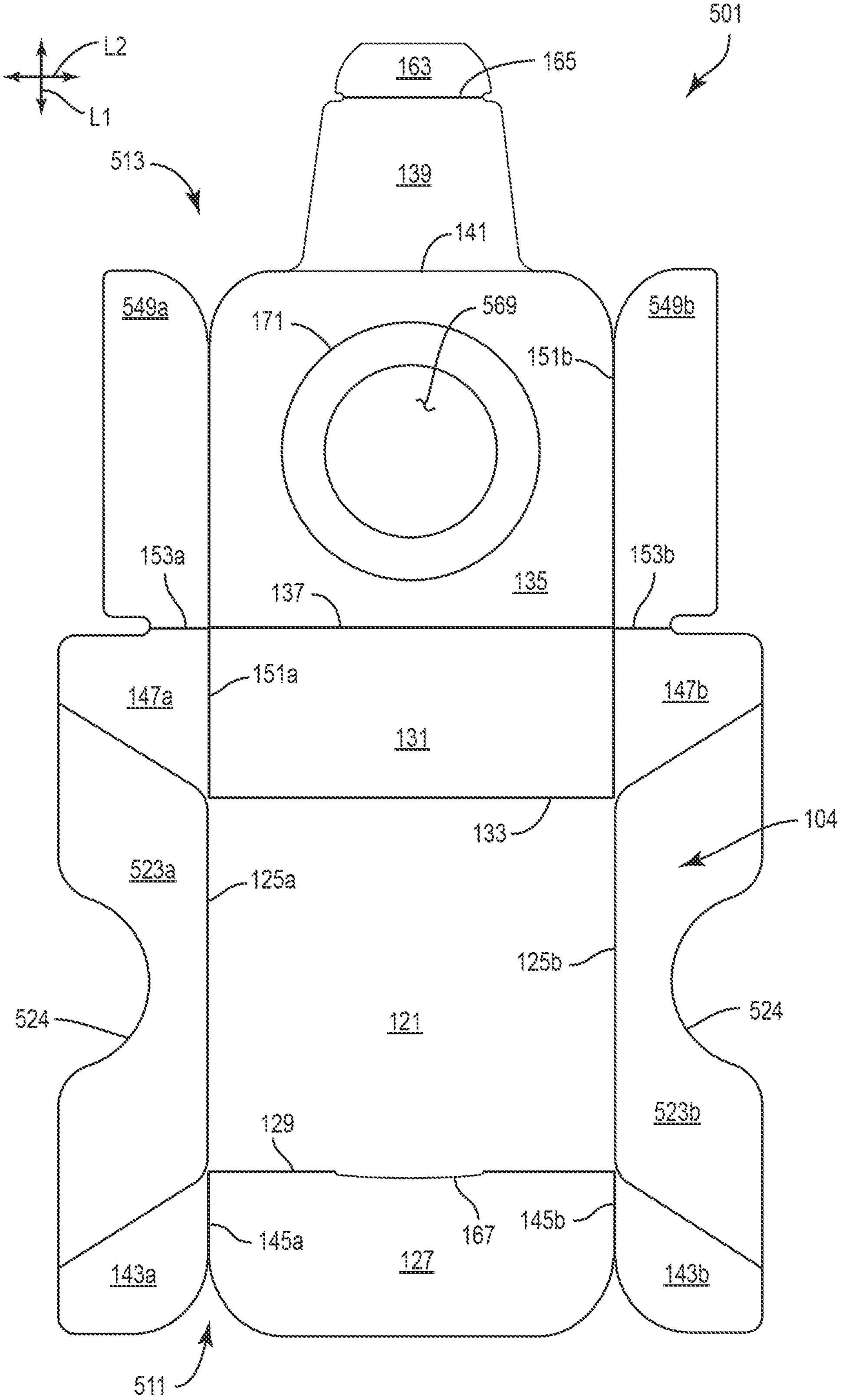
FIG. 15 is an exterior plan view of a blank used to form a construct according to a fourth exemplary embodiment of the disclosure.

FIG. 15 shows a blank 501 for forming a wrap 503 and package 505 (FIGS. 16-19) according to a fourth embodiment of the disclosure. The fourth embodiment is generally similar to the prior embodiments, except for variations noted and variations that will be apparent to one of ordinary skill in the art. Accordingly, similar or identical features of the embodiments have been given like or similar reference numbers. In the fourth embodiment, the wrap 503 formed from the blank 501 is configured for holding two containers C4 (e.g., sealed trays or tubs and/or any other suitable containers) or any suitable number of containers. In the illustrated embodiment, the relative proportions of different aspects of the blank 501 can be adjusted for holding the containers C4 relative to the blanks of the prior embodiments configured for holding the containers C1, C2, and/or C3.

As shown in FIG. 15, the second or upper portion 513 can form the cover portion 508 (FIGS. 16-19) with top glue panels 549*a*, 549*b* foldably connected to the top panel 135 along respective longitudinal fold lines 151*a*, 151*b*. In one embodiment, the top panel 135 can include an opening 569 (e.g., a circular opening). Also, as shown in FIG. 15, the first or lower portion 511 can form the tray portion 506 with the first or bottom compartment 507 (FIGS. 16-19) with the side panels 523*a*, 523*b*, the front panel 127, and the back panel 131 foldably connected to the bottom panel 121 along respective fold lines 125*a*, 125*b*, 129, 133. The side panels 523*a*, 523*b* each can include a cutout or a curved edge 524 (e.g., an edge that is arcuate, semicircular, or any other suitable shape) for viewing the containers C4 in the wrap 503 (e.g., for inspecting the containers and/or their contents). The blank 501 could be otherwise shaped, arranged, configured, and/or positioned without departing from the disclosure. For example, the opening 569 could be replaced by any suitable opening (e.g., the openings of the other embodiments or an opening having any suitable shape).

Figure 16:
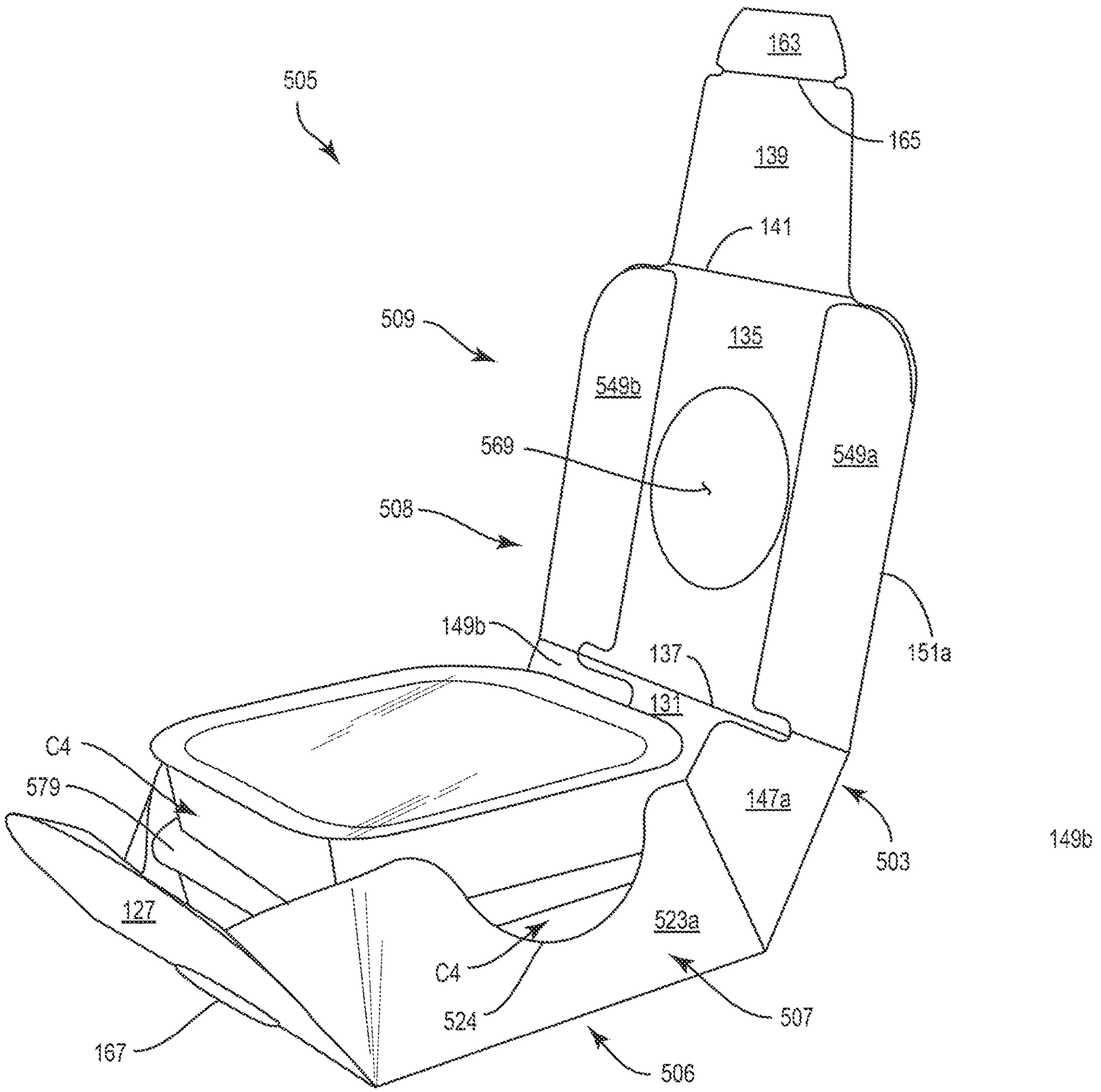
FIG. 16 is a perspective view of a package including a construct formed from the blank of FIG. 15 holding a plurality of articles/containers with the construct in an open configuration according to the fourth exemplary embodiment of the disclosure.
Figure 17:
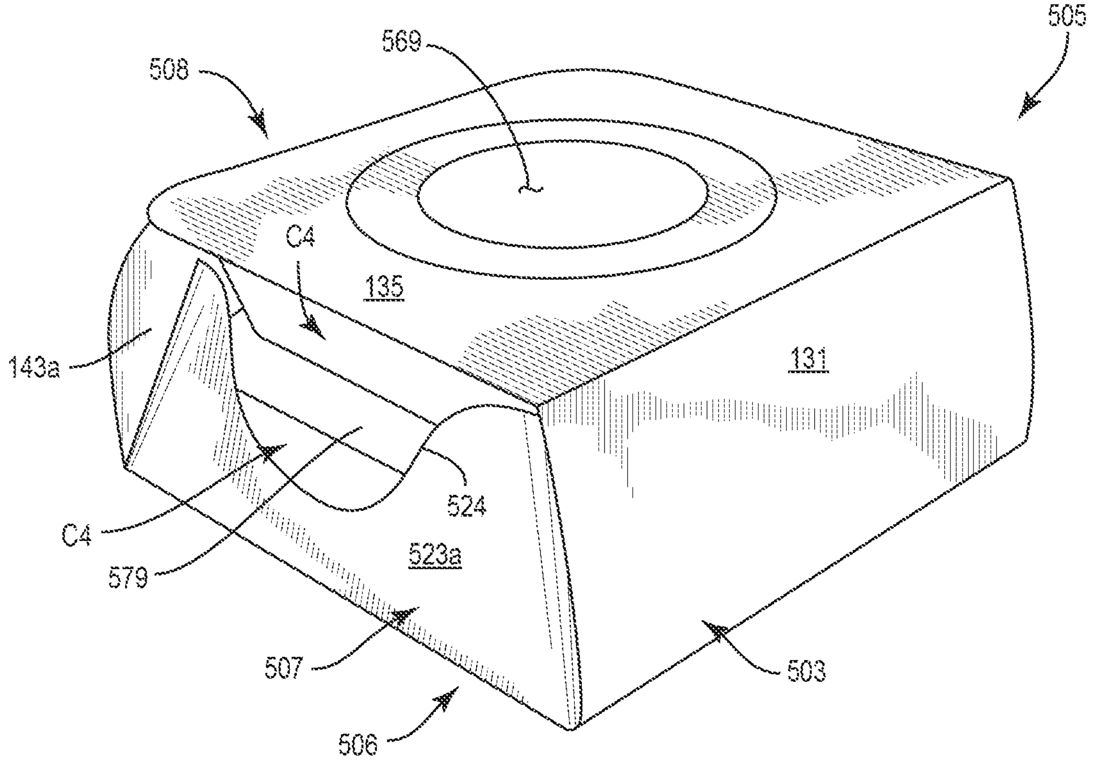
FIGS. 17 and 18 are perspective views of a package of FIG. 16 with the construct holding the articles/containers in a closed configuration according to the fourth exemplary embodiment of the disclosure.
Figure 18:
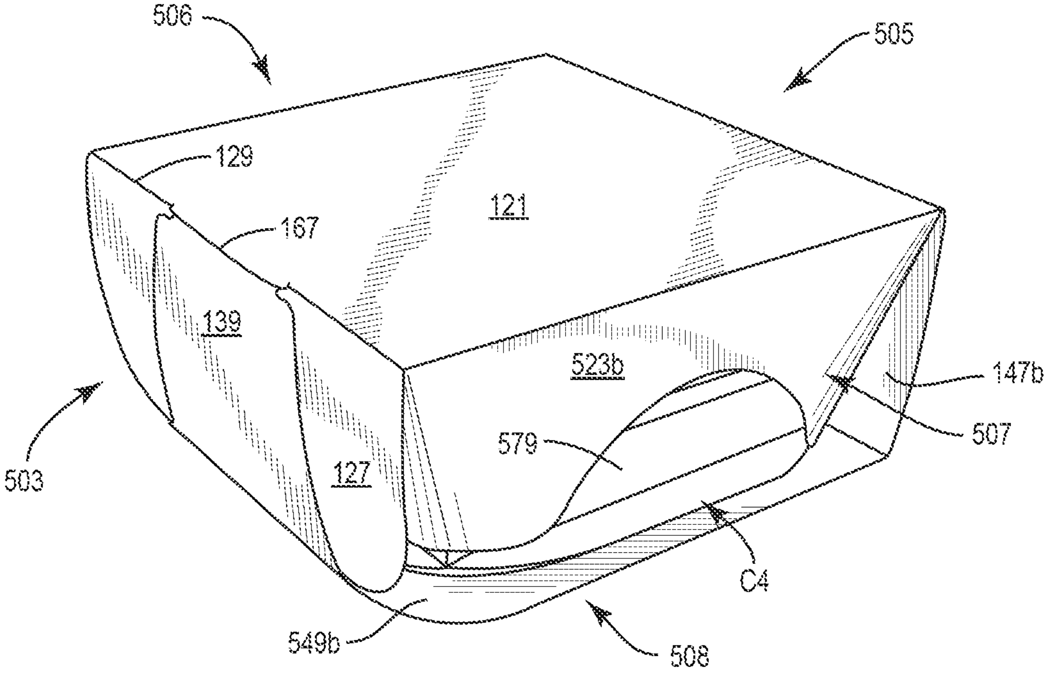
Figure 19:
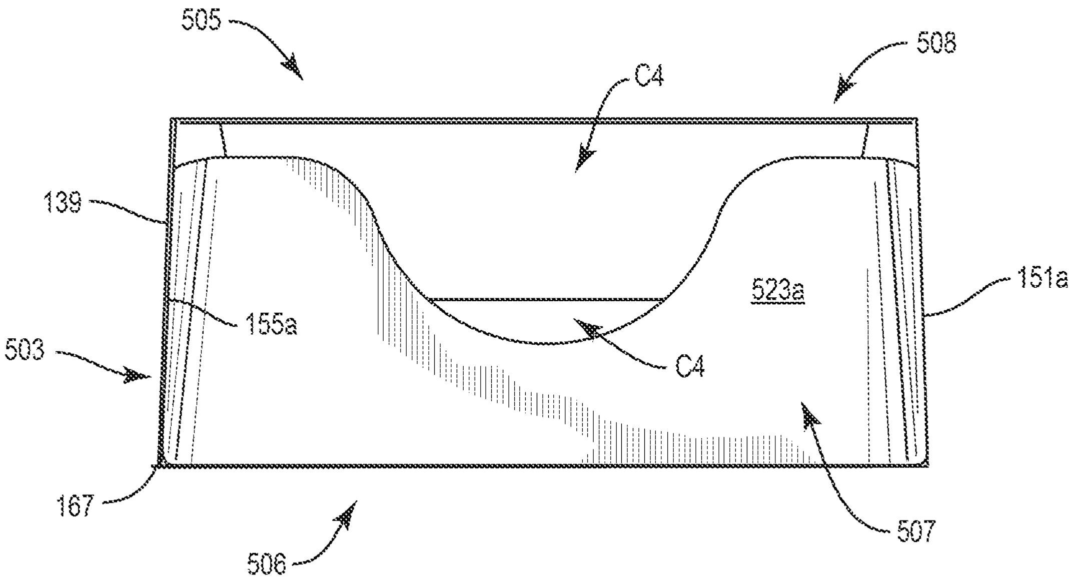
FIG. 19 is a side view of the package in the closed position of FIGS. 17 and 18 according to the fourth exemplary embodiment of the disclosure.

The wrap 503 (FIGS. 16-19) can be formed in the same manner or in a similar manner as the wraps 103, 203, 403 of the prior embodiments. For example, the top glue panels 549*a*, 549*b* can be glued in face-to-face contact with the top panel 135, the back glue panels 147*a*, 147*b* can be glued in face-to-face contact with the back panel 131, and the front glue panels 143*a*, 143*b* can be glued in face-to-face contact with the front panel 127 as shown in FIG. 16. As shown in FIG. 16, the side panels 523*a*, 523*b* can be folded upwardly along the U-shaped fold lines 125*a*, 125*b*, which can cause the front panel 127 and the back panel 131 to fold upwardly along the respective fold lines 129, 133 (e.g., via the glued connection between the front glue panels 143*a*, 143*b* and the front panel 127 and between the back glue panels 147*a*, 147*b* and the back panel 131). In the illustrated embodiment, the containers C4 can be loaded into the wrap 503 by inserting the containers C4, one on top of the other, in the interior space of the bottom compartment 507 at least partially defined by the side panels 523*a*, 523*b*, the front panel 127, the back panel 131, and the bottom panel 121. In one embodiment, the side panels 523*a*, 523*b* can be wider in the L2 direction (e.g., as shown in FIG. 15) than the side panels 123*a*, 123*b* of the previous embodiments so that the side panels 523*a*, 523*b* can contact at least a portion of the lower container C4 (e.g., its rim) and/or at least a portion of the top container (e.g., its side) to help at least partially retain the containers C4 in the bottom compartment 507. As shown in FIG. 16, the rim of the top container C4 can extend above the side panels 523*a*, 523*b*, and a portion of the side panels 523*a*, 523*b* can extend between the rim of the lower container C4 and the rim of the upper container C4. In the illustrated embodiment, a support panel 579 (e.g., FIGS. 16-18) can be positioned between the two containers C4 (e.g., the support panel 579 can be positioned on top of the rim of the lower container C4, the support panel 579 can be glued or otherwise attached to the rim or another portion of the lower container C4, the support panel 579 can be the lid or cover of the lower container C4, for example replacing the film cover of the lower container C4, and/or the support panel 579 could be attached to the bottom of the upper container C4). As shown in FIG. 16, the upper container C4 can have a film cover. The package 505 in the open configuration is shown in FIG. 16. In exemplary embodiments, an unprotected film cover on the lower container C4 could be damaged by the weight of the upper container C4 (e.g., and its contents). However, the support panel 579 can comprise a sturdier material (e.g., paperboard and/or other suitable materials) for supporting the upper container C4 above the lower container C4 whether the support panel 579 extends over a film cover or is used in lieu of a film cover. The containers C4 and/or the support panel 579 could be otherwise shaped, arranged, configured, and/or positioned without departing from the disclosure.

In one embodiment, the package 505 can be moved to the closed configuration (FIGS. 17-19) by moving the wrap 503 with the loaded containers C4 in the same manner or in a similar manner as the wraps of the prior embodiments. In addition, the wrap 503 can be opened in the same manner or in a similar manner as the wraps of the prior embodiments. The wrap 503 and/or package 505 could be otherwise formed, loaded, closed, and/or opened without departing from the disclosure.

Figure 20:
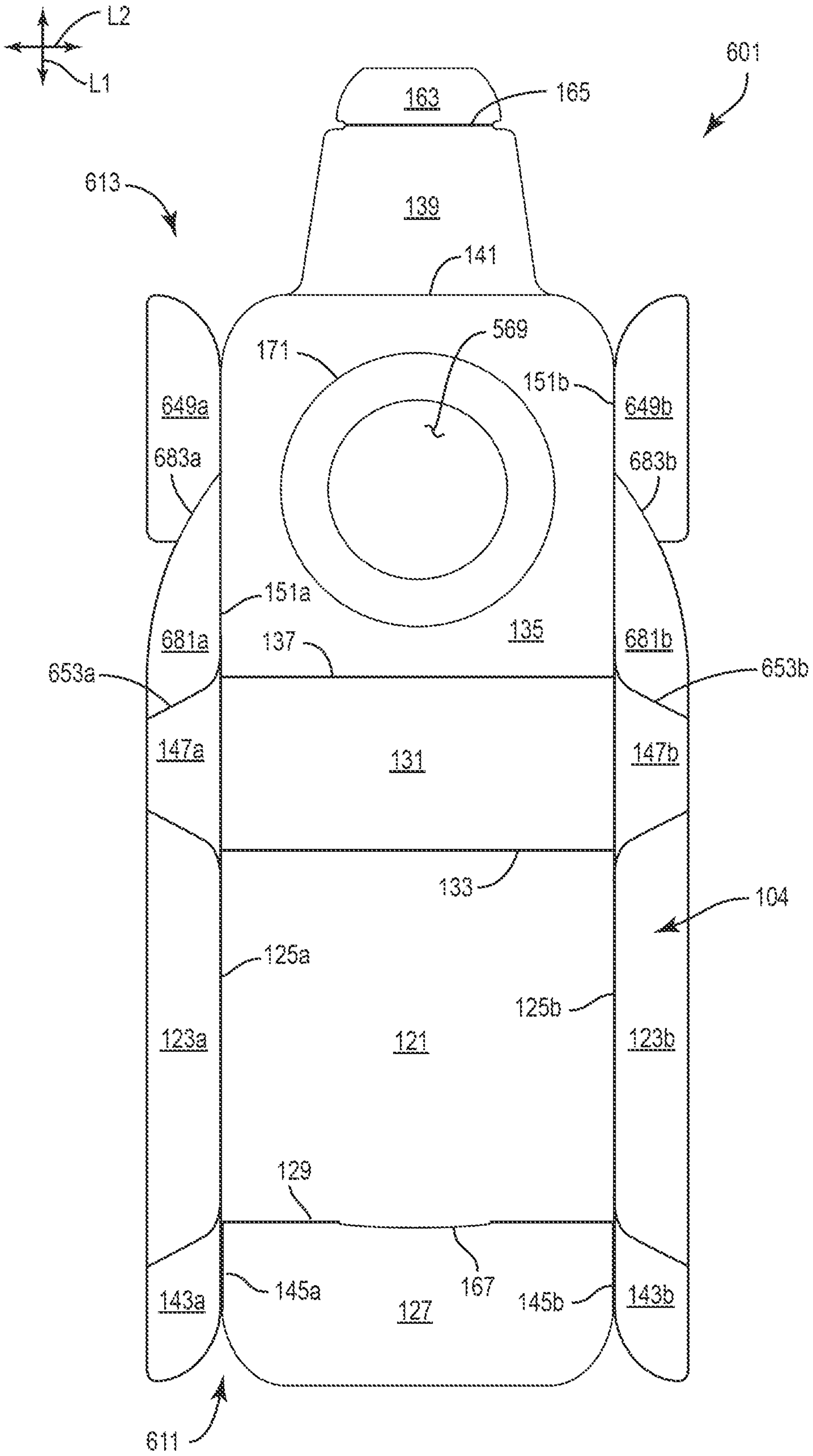
FIG. 20 is an exterior plan view of a blank used to form a construct according to a fifth exemplary embodiment of the disclosure.

FIG. 20 shows a blank 601 for forming a wrap 603 and package 605 (FIGS. 21-24) according to a fifth embodiment of the disclosure. The fifth embodiment is generally similar to the prior embodiments, except for variations noted and variations that will be apparent to one of ordinary skill in the art. Accordingly, similar or identical features of the embodiments have been given like or similar reference numbers. In the fifth embodiment, the wrap 603 formed from the blank 601 is configured for holding the two containers C4 (e.g., sealed trays or tubs and/or any other suitable containers) or any suitable number of containers. In the illustrated embodiment, the relative proportions of different aspects of the blank 601 can be adjusted for holding the containers C4 relative to the blanks of the prior embodiments configured for holding the containers C1, C2, and/or C3.

As shown in FIG. 20, the second or upper portion 613 can form the cover portion 608 with the second or top container holder 609 (FIGS. 21-24) with top glue panels 649*a*, 649*b* and top side panels 681*a*, 681*b* (or top flaps 681*a*, 681*b*) foldably connected to the top panel 135 along respective longitudinal fold lines 151*a*, 151*b*. The top flaps 681*a*, 681*b* can be foldably connected to the respective back glue panels 147*a*, 147*b* along respective fold lines 653*a*, 653*b* (e.g., at least partially curved fold lines), and the top flaps 681*a*, 681*b* can be separable from the respective top glue panels 648*a*, 689*b* along respective tear or cut lines 683*a*, 683*b*. In one embodiment, the cut lines 683*a*, 683*b* can be curved, and a free edge of the respective top flaps 681*a*, 681*b* can at least partially continue along the curve of the respective cut lines 683*a*, 683*b*. Alternatively, the top flaps 681*a*, 681*b* could have any suitable shape. In an exemplary embodiment, the cut lines 683*a*, 683*b* can have one or more nicks (not shown) at least partially connecting the top flaps 681*a*, 681*b* to the respective top glue panels 649*a*, 649*b* until the top flaps 681*a*, 681*b* are moved relative to the top glue panels 649*a*, 694*b* to at least partially break the nicks and separate the top flaps 681*a*, 681*b* from the top glue panels 649*a*, 694*b*. Alternatively, the nicks could be omitted and/or the lines 683*a*, 683*b* could be tear lines or any suitable lines of weakening.

As shown in FIG. 20, the first or lower portion 611 can be similar to the lower portion 111 of the previous embodiments and can form the tray portion 606 with the first or bottom compartment 607 (FIGS. 21-24), which can be similar to the bottom compartment 107 of the previous embodiments. The blank 501 could be otherwise shaped, arranged, configured, and/or positioned without departing from the disclosure. For example, the opening 569 could be replaced by any suitable opening (e.g., the openings of the other embodiments or an opening having any suitable shape).

Figure 21:
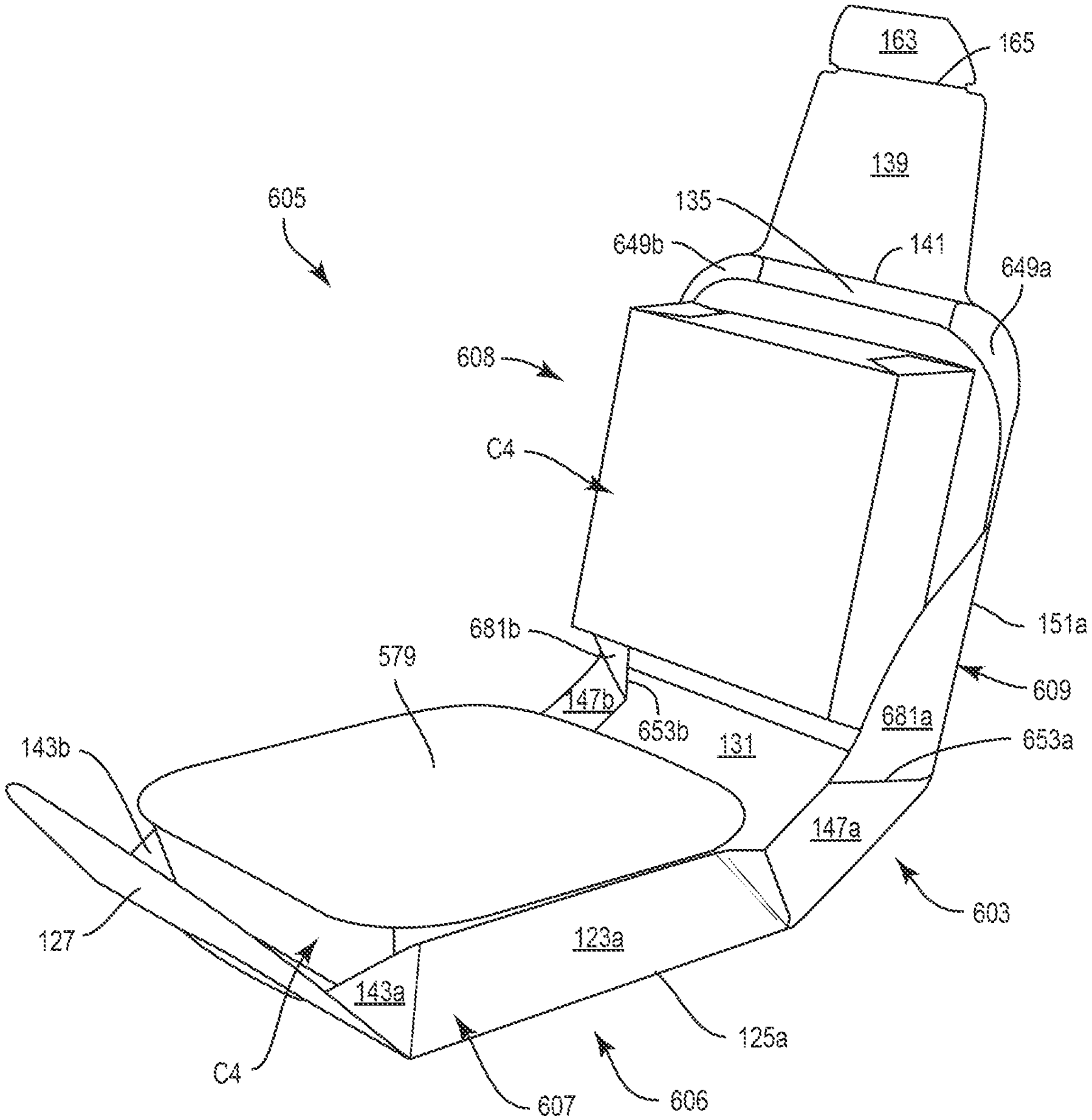
FIG. 21 is a perspective view of a package including a construct formed from the blank of FIG. 20 holding a plurality of articles/containers with the construct in an open configuration according to the fifth exemplary embodiment of the disclosure.
Figure 22:
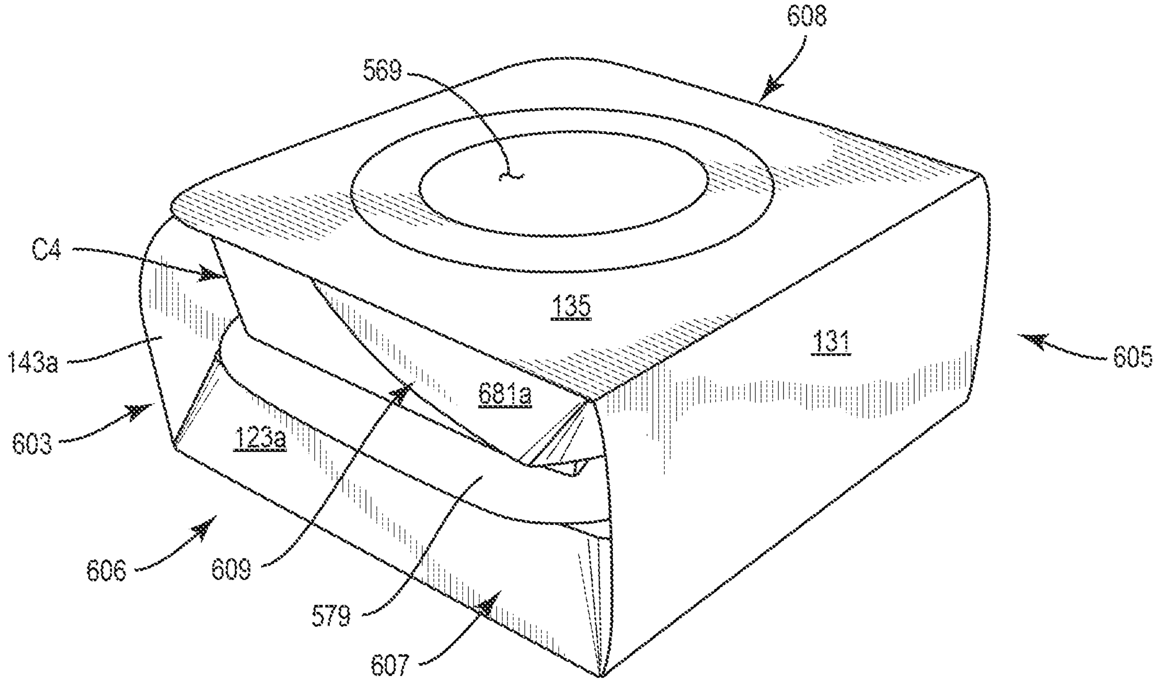
FIGS. 22 and 23 are perspective views of a package of FIG. 21 with the construct holding the articles/containers in a closed configuration according to the fifth exemplary embodiment of the disclosure.
Figure 23:
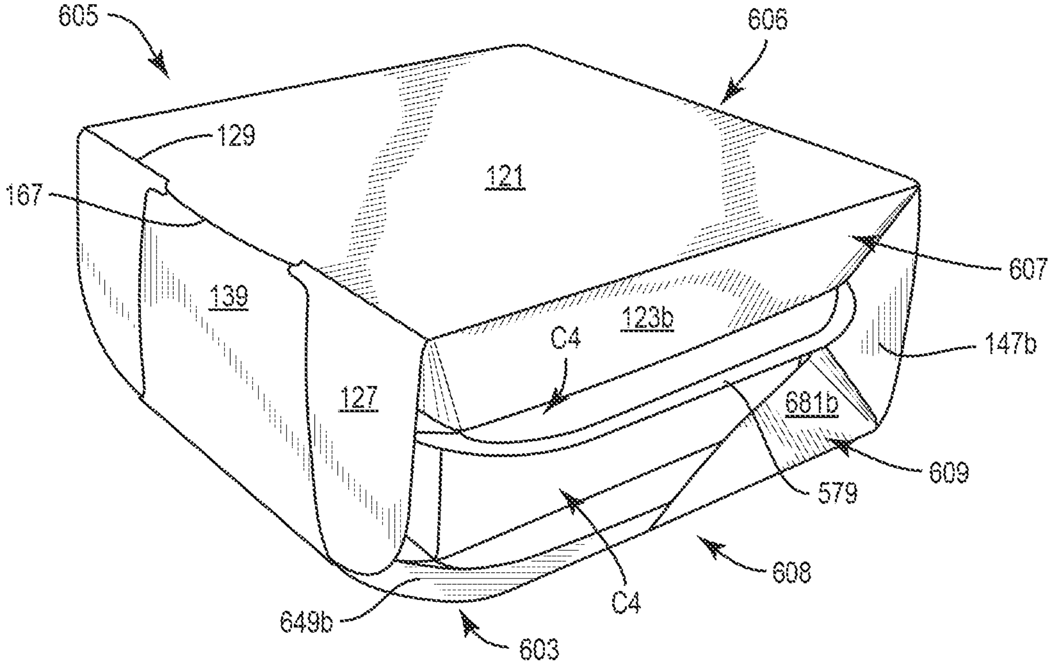
Figure 24:
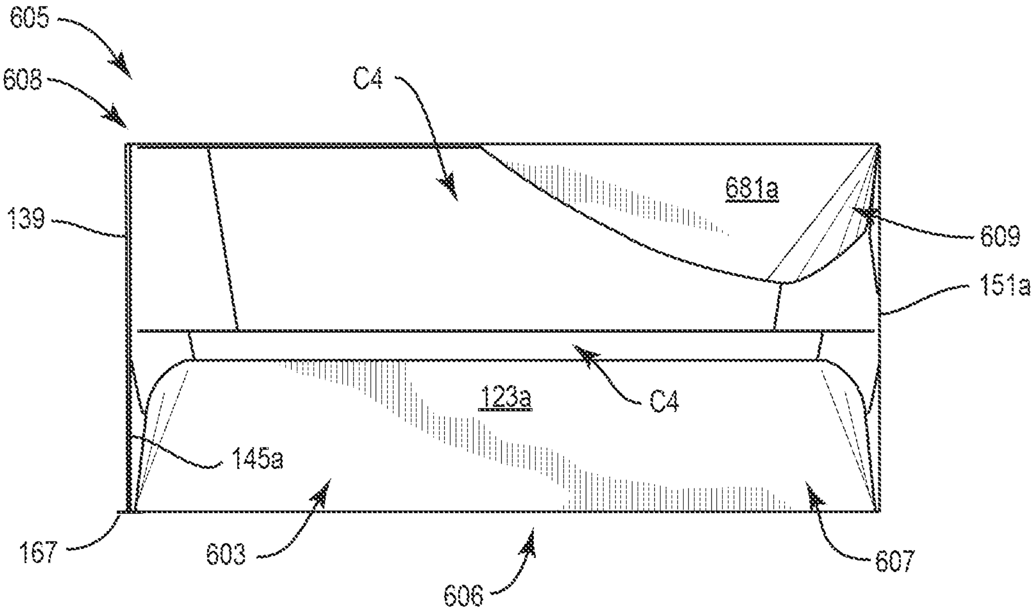
FIG. 24 is a side view of the package in the closed position of FIGS. 22 and 23 according to the fifth exemplary embodiment of the disclosure.

The wrap 603 (FIGS. 21-24) can be formed in the same manner or in a similar manner as the wraps 103, 203, 403, 503 of the prior embodiments. For example, the top glue panels 649*a*, 649*b* can be glued in face-to-face contact with the top panel 135, the back glue panels 147*a*, 147*b* can be glued in face-to-face contact with the back panel 131, and the front glue panels 143*a*, 143*b* can be glued in face-to-face contact with the front panel 127 as shown in FIG. 21. As shown in FIG. 21, the bottom side panels 123*a*, 123*b* can be folded upwardly along the U-shaped fold lines 125*a*, 125*b*, which can cause the front panel 127 and the back panel 131 to fold upwardly along the respective fold lines 129, 133 (e.g., via the glued connection between the front glue panels 143*a*, 143*b* and the front panel 127 and between the back glue panels 147*a*, 147*b* and the back panel 131). In addition, the top flaps 681*a*, 681*b* can be folded away from the top panel 135 along the respective fold lines 151*a*, 653*a* and 151*b*, 653*b*, at least partially separating the top flaps 681*a*, 681*b* from the respective top glue panels 649*a*, 649*b* along the respective cut lines 683*a*, 683*b*.

In the illustrated embodiment, one of the containers C4 (e.g., the container C4 that is at least partially covered by the support panel 579) can be positioned in the bottom compartment 607 between the bottom side panels 123*a*, 123*b* (FIG. 21), and the other container C4 can be positioned in the top container holder 609 between the top flaps 681*a*, 681*b* and the top panel 135. For example, the rim of the lower container C4 can extend above the upper edges of the bottom side panels 123*a*, 123*b*, and the bottom side panels 123*a*, 123*b* can at least partially contact the sides of the lower container C4. In the illustrated embodiment, the rim of the upper container C4 can be positioned against or proximate the top panel 135, and the upper container C4 can be at least partially engaged between the top flaps 681*a*, 681*b*. In an exemplary embodiment, the top flaps 681*a*, 681*b* can at least partially contact the sides of the upper container C4. In one embodiment, at least a portion of the rim of the upper container C4 can extend between the top panel 135 and the top flaps 681*a*, 681*b*. In an exemplary embodiment, the bottom side panels 123*a*, 123*b* and the top flaps 681*a*, 681*b* can be at least partially pulled inwardly (e.g., can extend obliquely and/or along a curve) by their foldable connections to the glue flaps 143*a*, 143*b* and/or 147*a*, 147*b* to help retain the containers C4 in the interiors of the compartments 607, 609. The package 605 in the open configuration is shown in FIG. 21.

In one embodiment, the package 605 can be moved to the closed configuration (FIGS. 22-24) by moving the wrap 603 with the loaded containers C4 in the same manner or in a similar manner as the wraps of the prior embodiments. In addition, the wrap 603 can be opened in the same manner or in a similar manner as the wraps of the prior embodiments. The wrap 603 and/or package 605 could be otherwise formed, loaded, closed, and/or opened without departing from the disclosure.

Figure 25:
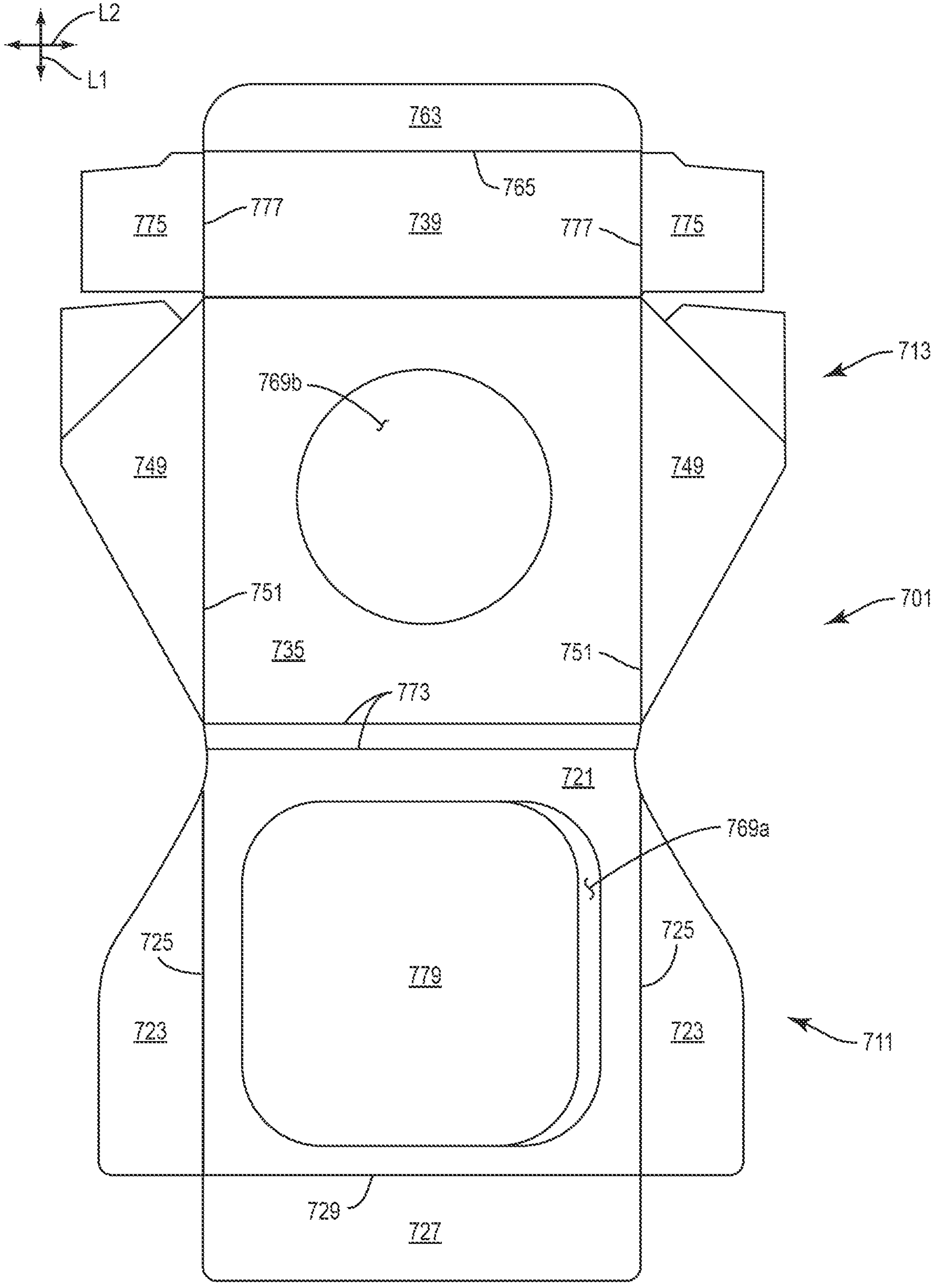
FIG. 25 is an exterior plan view of a blank used to form a construct according to a sixth exemplary embodiment of the disclosure.
Figure 26:
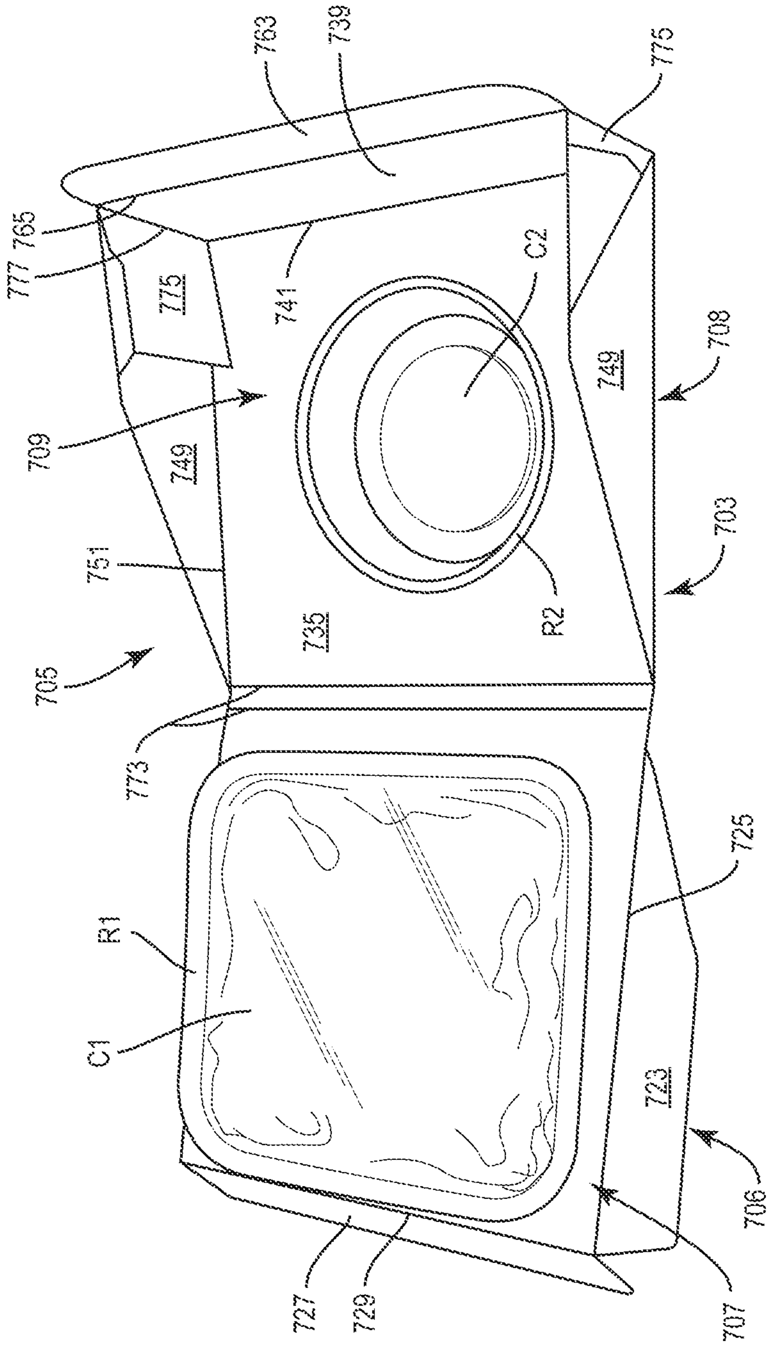
FIG. 26 is a perspective view of a package including a construct formed from the blank of FIG. 25 holding a plurality of articles/containers with the construct in an open configuration according to the sixth exemplary embodiment of the disclosure.

FIG. 25 shows a blank 701 for forming a construct 703 and package 705 (FIGS. 26-29) according to a sixth embodiment of the disclosure. The sixth embodiment is generally similar to the prior embodiments, except for variations noted and variations that will be apparent to one of ordinary skill in the art. Accordingly, similar or identical features of the embodiments have been given like or similar reference numbers. In the sixth embodiment, the blank 701 has a first or lower portion 711 and a second or upper portion 713, and the construct 703 formed from the blank 701 can include a base portion or tray 706 formed from the lower portion 111 and a top portion or lid or cover 708 formed from the upper portion 713. In the illustrated embodiment, the lower portion 111 and the tray 706 can include a central panel 721 (e.g., a bottom central panel 721), two tray side panels 723 foldably connected to the central panel 721 along fold lines 725, and a tray front panel 727 foldably connected to the central panel 721 along a fold line 729. In one embodiment, the central panel 721 can include a tray opening 769*a* (FIG. 25) that receives the container C1 (e.g., so that the rim R1 of the container C1 engages/contacts an interior surface of the central panel 721 and a portion of the container C1 extends through the tray opening 769*a* past an exterior surface of the central panel 721). Accordingly, the central panel 721 and the tray opening 769*a* at least partially form a bottom container holder 707 in the tray portion 706. The tray side panels 723 and the tray front panel 727 can be folded downwardly with respect to the central panel 721 to support the central panel 721 and to provide clearance between the central panel 721 and a support surface for the container C1 received in the central opening.

Figure 27:
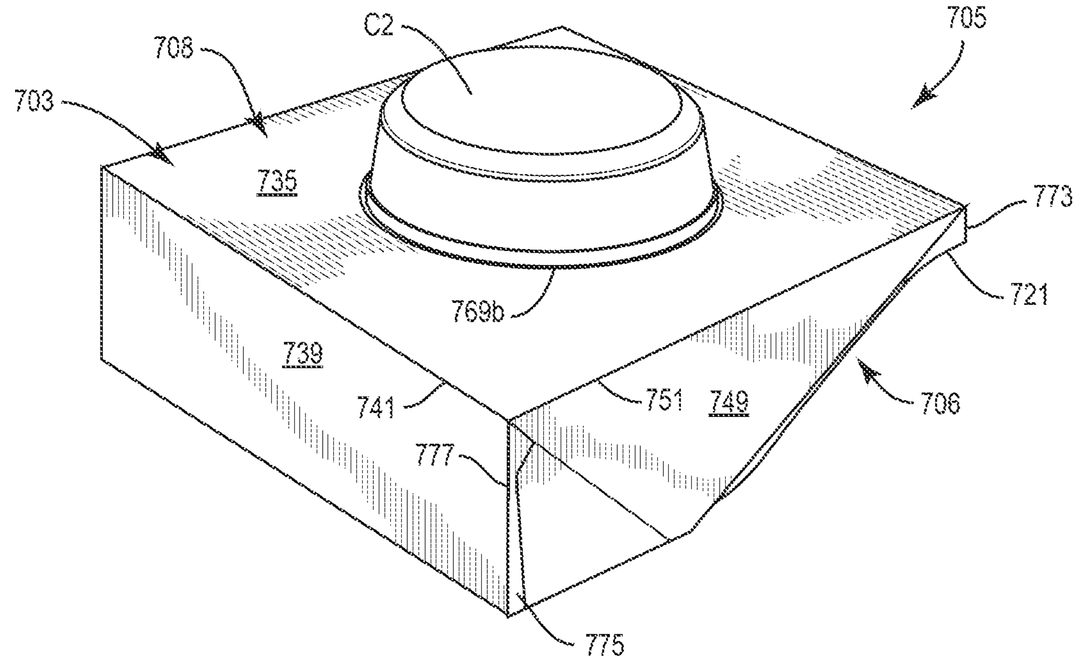
FIGS. 27 and 28 are perspective views of a package of FIG. 26 with the construct holding the articles/containers in a closed configuration according to the sixth exemplary embodiment of the disclosure.
Figure 28:
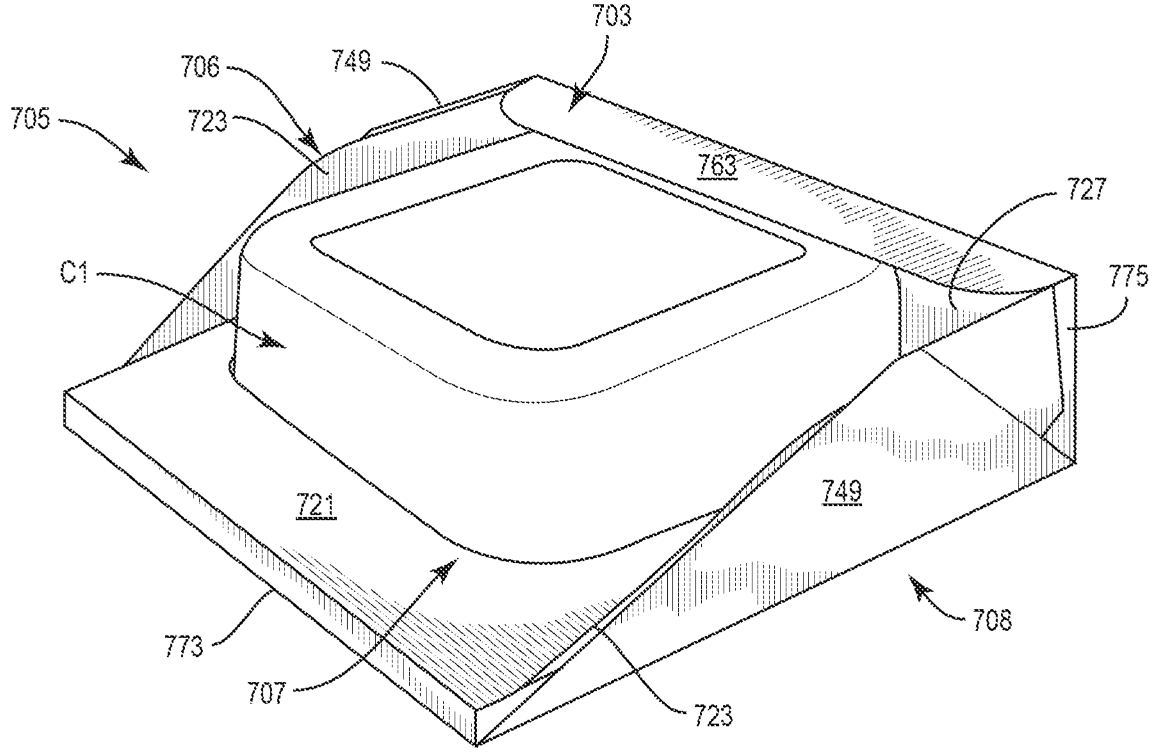
Figure 29:
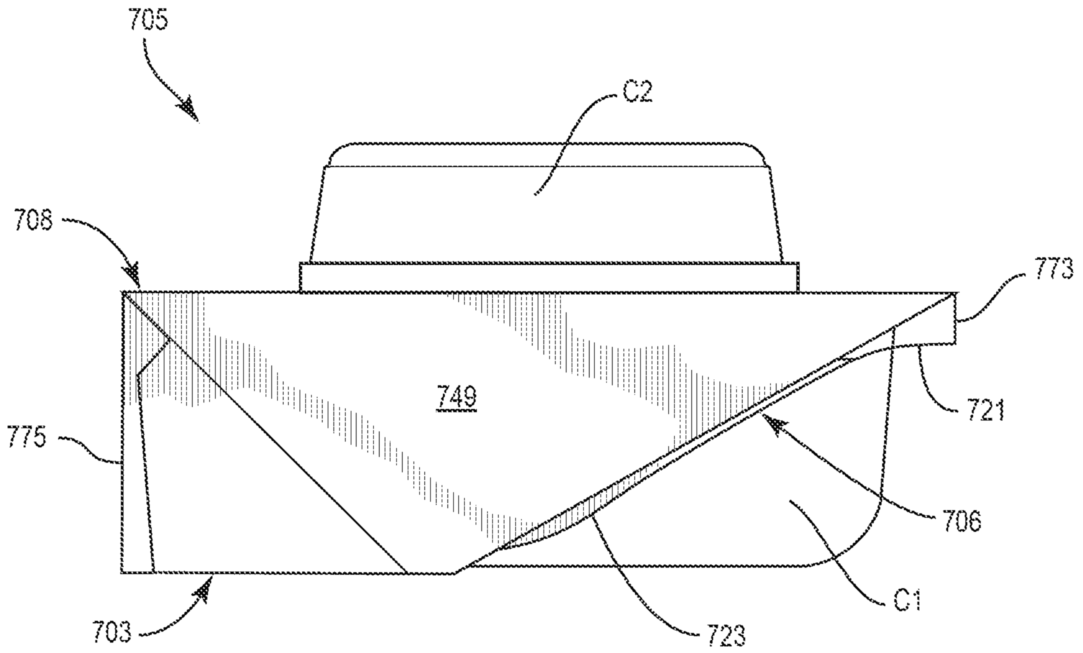
FIG. 29 is a side view of the package in the closed position of FIGS. 27 and 28 according to the sixth exemplary embodiment of the disclosure.

As shown in FIGS. 25-29, the upper portion 113 and the lid 708 can include a top panel 735 (e.g., a top central panel 735), two top side panels 749 foldably connected to the top panel 735 along fold lines 751, and a top front panel 739 foldably connected to the top panel 735 along a fold line 741. In the illustrated embodiment, the top panel 735 is foldably connected to the central panel 721 along a fold line 773 (e.g., one or more fold lines 773 and/or a folding area 773) so that the lid 708 is pivotable with respect to the tray 706 along the fold lines 773. As shown in FIGS. 25-29, the lid 708 can include a closure flap 763 foldably connected to the top front panel 739 along a fold line 765 and two attachment flaps 775 can be foldably connected to the top front panel 739 along fold lines 777. In the illustrated embodiment, the top side panels 749 and the top front panel 739 can be folded (e.g., upwardly in the open configuration of the construct shown in FIG. 26 or downwardly in the closed configuration of the construct shown in FIGS. 27-29) with respect to the top panel 735 and the attachment flaps 775 can be glued to an interior surface of the top side panels 749. In one embodiment, the top side panels 749 can include oblique fold lines proximate to where the attachment flaps 775 are glued to the top side panels 749 so that the ends of the top side panels 749 and the attachment flaps 775 form gussets that can allow the top front panel 739, the top side panels 749, and the attachment flaps 775 to fold inwardly against the top panel 735. The top panel 735 can include a lid opening 769*b* that receives the container C2 so that the rim R2 of the container C2 engages/contacts an interior surface of the top panel 735 (FIG. 26) and the sides and bottom of the container C2 protrude through the top of the construct 703 (e.g., a portion of the container C2 extends through the lid opening 769*b* past an exterior surface of the top panel 735) when the construct is in the closed configuration (FIGS. 27-29). Accordingly, the top panel 735 and the lid opening 769*b* can at least partially form a top container holder 709 in the lid portion 708.

In the illustrated embodiment, an inner support panel 779 can be cut from the bottom central panel 721 (e.g., when forming the tray opening 769*a*). The inner support panel 779 could be otherwise formed without departing from the disclosure. In one embodiment, the inner support panel 779 can be separated from the blank 731 when forming the construct 703 and can be placed between the containers C1, C2 for supporting the container C2 above the container C1 in the closed package 705. Accordingly, the inner support panel 779 can help prevent the weight of the container C2 from damaging the film cover of the lower container C1 when the package 705 is in the closed, upright configuration (FIGS. 27 and 29). The construct 703 and the package 705 could be otherwise shaped, arranged, configured, and/or positioned without departing from the disclosure.

Any of the features of the various embodiments of the disclosure can be combined with replaced by, or otherwise configured with other features of other embodiments of the disclosure without departing from the scope of this disclosure. The carrier styles and panel configurations described above are included by way of example.

In general, the blank may be constructed from paperboard having a caliper so that it is heavier and more rigid than ordinary paper. The blank can also be constructed of other materials, such as cardboard, or any other material having properties suitable for enabling the carrier to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

In accordance with the exemplary embodiments, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

The above embodiments may be described as having one or more panels adhered together by glue during erection of the carrier embodiments. The term "glue" is intended to encompass all manner of adhesives commonly used to secure carrier panels in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A construct for holding a plurality of containers, the construct comprising:

- a central panel at least partially defining a tray opening for at least partially receiving a first container of the plurality of containers;
- a tray front panel foldably connected to the central panel and extending downwardly from the central panel;
- a top panel at least partially defining a lid opening for at least partially receiving a second container of the plurality of containers; and
- a top front panel foldably connected to the top panel and extending downwardly from the top panel when the construct is in a closed configuration, wherein the top front panel and the tray front panel are in an at least partially overlapping relationship when the construct is in the closed configuration.

2. The construct of claim 1, wherein a closure flap is foldably connected to the top front panel, and the closure flap is at least partially folded under the tray front panel when the construct is in the closed configuration.

3. The construct of claim 1, further comprising a tray side panel foldably connected to the central panel and a top side panel foldably connected to the top panel, wherein the top side panel and the tray side panel are in an at least partially overlapping relationship when the construct is in the closed configuration.

4. The construct of claim 1, wherein the top panel is foldably connected to the central panel along one or more fold lines.

5. A package, comprising:

- a plurality of containers comprising at least a first container and a second container; and
- a construct comprising:
  - a central panel at least partially defining a tray opening that at least partially receives the first container;
  - a tray front panel foldably connected to the central panel and extending downwardly from the central panel;
  - a top panel at least partially defining a lid opening that at least partially receives the second container; and
  - a top front panel foldably connected to the top panel and extending downwardly from the top panel when the construct is in a closed configuration, wherein the top front panel and the tray front panel are in an at least partially overlapping relationship when the construct is in the closed configuration.

6. The package of claim 5, wherein a closure flap is foldably connected to the top front panel, and the closure flap is at least partially folded under the tray front panel and the first container when the construct is in the closed configuration.

7. The package of claim 5, wherein the top panel is foldably connected to the central panel along one or more fold lines.

8. The package of claim 5, wherein the first container comprises a first rim at least partially in contact with an interior surface of the central panel and the second container comprises a second rim in contact with an interior surface of the top panel so that at least a portion of each of the first rim and the second rim extends between the central panel and the top panel.

9. The package of claim 8, wherein at least a portion of the first container extends through the tray opening past an exterior surface of the central panel and at least a portion of the second container extends through the lid opening past an exterior surface of the top panel.

10. A blank for forming a construct for holding a plurality of containers, the blank comprising:

- a central panel at least partially defining a tray opening for at least partially receiving a first container of the plurality of containers when the construct is formed from the blank;
- a tray front panel foldably connected to the central panel, the tray front panel being for extending downwardly from the central panel when the construct is formed from the blank;
- a top panel at least partially defining a lid opening for at least partially receiving a second container of the plurality of containers when the construct is formed from the blank; and a top front panel foldably connected to the top panel, the top front panel being for extending downwardly from the top panel when the construct formed from the blank is in a closed configuration, wherein the top front panel and the tray front panel are in an at least partially overlapping relationship when the construct formed from the blank is in the closed configuration.

11. The blank of claim 10, wherein a closure flap is foldably connected to the top front panel, and the closure flap is for being at least partially folded under the tray front panel when the construct formed from the blank is in the closed configuration.

12. The blank of claim 10, further comprising a tray side panel foldably connected to the central panel and a top side panel foldably connected to the top panel, wherein the top side panel and the tray side panel are for being in an at least partially overlapping relationship when the construct formed from the blank is in the closed configuration.

13. The blank of claim 10, wherein the top panel is foldably connected to the central panel along one or more fold lines.

* * * * *